US012772121B2

(12) United States Patent
Lin

(10) Patent No.: US 12,772,121 B2
(45) Date of Patent: Oct. 20, 2026

(54) DEVICE AND METHOD OF HANDLING A HANDOVER

(71) Applicant: ACER INCORPORATED, New Taipei City (TW)

(72) Inventor: Jung-Mao Lin, New Taipei City (TW)

(73) Assignee: ACER INCORPORATED, New Taipei City (TW)

(*) Notice: Subject to any disclaimer, the term of this patent is extended or adjusted under 35 U.S.C. 154(b) by 242 days.

(21) Appl. No.: 17/873,121

(22) Filed: Jul. 25, 2022

(65) Prior Publication Data

US 2023/0058443 A1 Feb. 23, 2023

Related U.S. Application Data

(60) Provisional application No. 63/235,176, filed on Aug. 20, 2021.

(51) Int. Cl.
*H04W 36/00* (2009.01)
*H04W 36/08* (2009.01)
*H04W 36/18* (2009.01)

(52) U.S. Cl.
CPC .... *H04W 36/0058* (2018.08); *H04W 36/0011* (2013.01); *H04W 36/0079* (2018.08); *H04W 36/08* (2013.01); *H04W 36/185* (2023.05); *H04W 36/00838* (2023.05)

(58) Field of Classification Search
CPC .............................................. H04W 36/00-385
See application file for complete search history.

(56) References Cited

U.S. PATENT DOCUMENTS

| | | | | |
|---|---|---|---|---|
| 10,827,398 | B2 * | 11/2020 | Park | H04W 36/0016 |
| 11,523,313 | B2 * | 12/2022 | Latheef | H04W 36/302 |
| 11,991,571 | B2 * | 5/2024 | Yiu | H04W 36/0058 |

(Continued)

FOREIGN PATENT DOCUMENTS

| | | | |
|---|---|---|---|
| CN | 113286331 | A | 8/2021 |
| JP | 2021-510272 | A | 4/2021 |

(Continued)

OTHER PUBLICATIONS

3GPP TS 36.300 V16.2.0 (Jul. 2020); 3rd Generation Partnership Project; Technical Specification Group Radio Access Network; Evolved Universal Terrestrial Radio Access (E-UTRA) and Evolved Universal. Terrestrial Radio Access Network (E-UTRAN); Overall description; Stage 2 (Release 16), pp. 1-390, Jul. 2020.

(Continued)

*Primary Examiner* — Bob A Phunkulh
(74) *Attorney, Agent, or Firm* — Winston Hsu

(57) ABSTRACT

A method for handling a handover of a communication device includes receiving a radio resource control (RRC) configuration message from a source network, wherein the RRC configuration message includes at least one execution condition of at least one target network; transmitting a handover trigger message to the source network, when an execution condition of the at least one execution condition is satisfied; performing the handover from the source network to a target network of the at least one target network, wherein the target network is corresponding to the execution condition; and transmitting a handover complete message to the target network, after performing the handover.

20 Claims, 22 Drawing Sheets

(56) References Cited

U.S. PATENT DOCUMENTS

| | | | | |
|---|---|---|---|---|
| 12,052,617 | B2 * | 7/2024 | Kim | H04W 36/00837 |
| 2015/0117410 | A1 * | 4/2015 | Wu | H04L 1/08 370/329 |
| 2019/0223073 | A1 * | 7/2019 | Chen | H04W 36/0077 |
| 2019/0261411 | A1 * | 8/2019 | Chin | H04W 74/0833 |
| 2020/0154326 | A1 | 5/2020 | Deenoo | |
| 2020/0314717 | A1 * | 10/2020 | Kim | H04W 74/0833 |
| 2020/0351725 | A1 * | 11/2020 | Kim | H04W 76/15 |
| 2021/0014922 | A1 * | 1/2021 | Chen | H04W 76/19 |
| 2021/0105671 | A1 * | 4/2021 | Van Der Velde | H04W 36/185 |
| 2021/0105674 | A1 * | 4/2021 | Kim | H04W 74/0833 |
| 2021/0105675 | A1 * | 4/2021 | Kim | H04W 28/06 |
| 2021/0136635 | A1 * | 5/2021 | Kim | H04W 28/0268 |
| 2021/0136829 | A1 * | 5/2021 | Kim | H04W 36/08 |
| 2021/0211956 | A1 * | 7/2021 | Kim | H04W 36/0079 |
| 2021/0243667 | A1 * | 8/2021 | Awada | H04W 36/38 |
| 2022/0007212 | A1 * | 1/2022 | Hwang | H04W 76/38 |
| 2022/0030483 | A1 * | 1/2022 | Cheng | H04W 36/0058 |
| 2022/0030485 | A1 * | 1/2022 | Kim | H04W 74/08 |
| 2022/0038976 | A1 * | 2/2022 | Hwang | H04W 36/0079 |
| 2022/0070740 | A1 * | 3/2022 | Futaki | H04W 36/0061 |
| 2022/0116838 | A1 * | 4/2022 | Kumar | H04W 36/0058 |
| 2022/0191751 | A1 * | 6/2022 | Rune | H04W 36/362 |
| 2022/0191755 | A1 * | 6/2022 | Ohlsson | H04W 36/00837 |
| 2022/0217597 | A1 * | 7/2022 | Ishii | H04W 36/362 |
| 2022/0272589 | A1 * | 8/2022 | Ishii | H04W 76/20 |
| 2022/0330125 | A1 * | 10/2022 | Ishii | H04W 36/362 |
| 2022/0369171 | A1 * | 11/2022 | Kim | H04W 36/185 |
| 2022/0386182 | A1 * | 12/2022 | Kim | H04W 36/087 |
| 2022/0386204 | A1 * | 12/2022 | Parichehrehteroujeni | H04W 24/08 |
| 2022/0400415 | A1 * | 12/2022 | Xie | H04W 36/0079 |
| 2023/0045700 | A1 * | 2/2023 | Wu | H04W 36/00698 |
| 2023/0053069 | A1 * | 2/2023 | Ohlsson | H04W 36/0005 |
| 2023/0119118 | A1 * | 4/2023 | Byun | H04W 36/0064 455/442 |
| 2023/0140745 | A1 * | 5/2023 | Da Silva | H04W 36/362 370/331 |
| 2023/0156539 | A1 * | 5/2023 | Wu | H04W 76/19 370/331 |
| 2023/0180330 | A1 * | 6/2023 | Chang | H04W 76/15 370/329 |
| 2023/0189092 | A1 * | 6/2023 | Wang | H04W 36/0058 370/331 |
| 2023/0189112 | A1 * | 6/2023 | Wu | H04W 76/38 455/437 |
| 2023/0247501 | A1 * | 8/2023 | Kim | H04W 36/06 370/331 |
| 2023/0247512 | A1 * | 8/2023 | Hévizi | H04W 36/322 370/331 |
| 2023/0262538 | A1 * | 8/2023 | Kim | H04W 52/0235 370/331 |
| 2023/0262542 | A1 * | 8/2023 | Chang | H04W 36/305 370/331 |
| 2023/0262545 | A1 * | 8/2023 | Stanczak | H04W 36/0079 370/331 |
| 2023/0262546 | A1 * | 8/2023 | Teyeb | H04W 36/0069 370/331 |
| 2023/0262565 | A1 * | 8/2023 | Chang | H04W 36/185 455/437 |
| 2023/0269647 | A1 * | 8/2023 | Ramachandra | H04W 36/0069 370/331 |
| 2023/0319652 | A1 * | 10/2023 | Yang | H04W 36/249 370/331 |
| 2023/0422137 | A1 * | 12/2023 | Wu | H04W 36/305 |
| 2024/0073755 | A1 * | 2/2024 | Yan | H04W 36/0069 |
| 2024/0380471 | A1 * | 11/2024 | Wu | H04W 74/0833 |

FOREIGN PATENT DOCUMENTS

| | | | |
|---|---|---|---|
| JP | 2023-509713 | A | 3/2023 |
| WO | 2020/226336 | A1 | 11/2020 |
| WO | 2021/066532 | A1 | 4/2021 |
| WO | 2021/109394 | A1 | 6/2021 |
| WO | 2021/139611 | A1 | 7/2021 |
| WO | 2021/154140 | A1 | 8/2021 |
| WO | 2022/031075 | A1 | 2/2022 |

OTHER PUBLICATIONS

Sony, Early Handover Trigger for NW controlled HO, (Mobility Robustness), 3GPP TSG RAN WG2 Meeting #105, R2-1901429, Athens, Greece, Feb. 25-Mar. 1, 2019, https://www.3gpp.org/ftp/tsg_ran/WG2_RL2/TSGR2_105/Docs/R2-1901429.zip.

3GPP TS 38.331 V16.5.0 (Jun. 2021); 3rd Generation Partnership Project; Technical Specification Group Radio Access Network; NR; Radio Resource Control (RRC) protocol specification (Release 16), https://www.3gpp. org/ftp/Specs/archive/38_series/38.331/38331-g50.zip, Jun. 2021.

CMCC, Consideration of Beamforming for NR Conditional Handover, 3GPP TSG-RAN WG2 Meeting #106 R2-1905949, May 13-17, 2019, p. 1-3, XP051729441, Reno, USA.

ETRI, Indication of DAPS Handover Execution to the Source, 3GPP TSG-RAN WG2 Meeting #109bis-e R2-2003530, Electronic, Apr. 20-Apr. 30, 2020, p. 1-8, XP051871455.

China Telecom, Stage-2 CR for introduction of even further mobility enhancement in E-UTRAN, 3GPP TSG-RAN2 Meeting #109 R2-2001653, Feb. 24-28, 2020, p. 1-35, XP051849944, Athens, Greece, Feb. 24, 2020.

Qualcomm Incorporated, LTE Conditional HO failure handling, 3GPP TSG-RAN WG2 Meeting #107 R2-1909878, Aug. 26-30, 2019, p. 1-5, XP051767669, Prague, Czech Republic, Aug. 26, 2019.

Huawei, Hisilicon, Discussion on subsequent RRC procedures after DAPS handover[online], 3GPP TSG RAN WG2 #109bis-e R2-2003046, Apr. 20-30, 2020 ,Apr. 20, 2020.

CMCC, Combination of CHO and DAPS HO, 3GPP TSG-RAN WG2 Meeting #109 electronic, R2-2000923, Elbonia, Feb. 24-Mar. 6, 2020 ,Feb. 24, 2020.

* cited by examiner

40

| Execution Condition | RRC Configuration |
|---|---|
| ExCond1 of TN1 | RRCReconfig1 of TN1 |
| ExCond2 of TN2 | RRCReconfig2 of TN2 with DAPS_config |
| ExCond3 of TN3 | RRCReconfig3 of TN3 with DAPS_config |

FIG. 4

DEVICE AND METHOD OF HANDLING A HANDOVER

CROSS REFERENCE TO RELATED APPLICATIONS

This application claims the benefit of U.S. Provisional Application No. 63/235,176, filed on Aug. 20, 2021. The content of the application is incorporated herein by reference.

BACKGROUND OF THE INVENTION

1. Field of the Invention

The present invention relates to a device and a method used in a wireless communication system, and more particularly, to a device and a method of handling a handover.

2. Description of the Prior Art

A long-term evolution (LTE) system supporting the 3rd Generation Partnership Project (3GPP) Rel-8 standard and/or the 3GPP Rel-9 standard is developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

An LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

In the 3GPP Rel-16 standard, a dual active protocol stack (DAPS) handover is proposed to reduce a handover interruption time. The handover interruption time may approach 0 milliseconds. However, the DAPS handover cannot be performed in a high frequency (e.g., Frequency Range 2 (FR2)). The operators consider that it is required to perform the DAPS handover in the high frequency, because some services operated in the high frequency intend to achieve a consistent data rate with a low interruption time. Thus, how to perform a robust handover with the low interruption time in the high frequency is an important problem to be solved.

SUMMARY OF THE INVENTION

The present invention therefore provides a communication device and method for handling a handover to solve the abovementioned problem.

A method for handling a handover of a communication device, comprising: receiving a radio resource control (RRC) configuration message from a source network, wherein the RRC configuration message comprises at least one execution condition of at least one target network;

transmitting a handover trigger message to the source network, when an execution condition of the at least one execution condition is satisfied; performing the handover from the source network to a target network of the at least one target network, wherein the target network is corresponding to the execution condition; and transmitting a handover complete message to the target network, after performing the handover.

A method for handling a handover of a communication device, comprising: receiving a radio resource control (RRC) configuration message from a source network, wherein the RRC configuration message comprises at least one execution condition of at least one target network; transmitting a handover trigger message to the source network, when an execution condition of the at least one execution condition is satisfied; starting a timer, after transmitting the handover trigger message to the source network; detecting a failure of the handover from the source network to a target network of the at least one target network, when the timer expires, wherein the target network is corresponding to the execution condition; and triggering a handover failure procedure according to the failure of the handover.

A method for handling a handover of a communication device, comprising: receiving a radio resource control (RRC) configuration message from a source network, wherein the RRC configuration message comprises at least one RRC configuration of at least one target network; triggering a handover from the source network to a suitable network, wherein the suitable network is one of the at least one target network; performing a dual active protocol stack (DAPS) handover from the source network to the suitable network, when an enable DAPS condition is satisfied and an RRC configuration of the suitable network comprises a DAPS configuration; and performing a first normal handover from the source network to the suitable network instead of the DAPS handover, when the enable DAPS condition is not satisfied.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of an RRC configuration message according to an example of the present invention.

DETAILED DESCRIPTION

Figure 1:
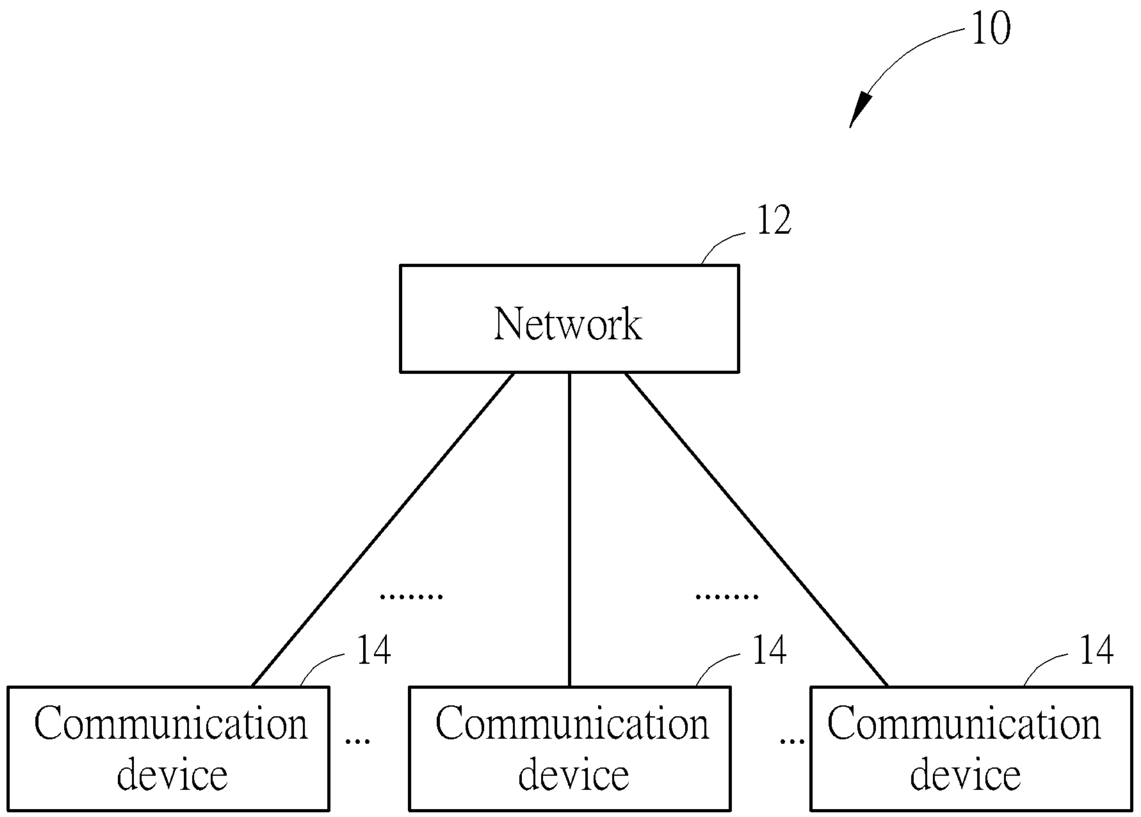
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network 12 and a plurality of communication devices 14. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network 12 and a communication device 14 may communicate with each other via FDD carrier(s), TDD carrier(s), licensed carrier(s) (licensed serving cell (s)) and/or unlicensed carrier(s) (unlicensed serving cell(s)). In addition, the wireless communication system 10 may support a carrier aggregation (CA). That is, the network 12 and a communication device 14 may communicate with each other via multiple serving cells (e.g., multiple serving carriers) including a primary cell (e.g., primary component carrier) and one or more secondary cells (e.g., secondary component carriers).

In FIG. 1, the network 12 and the communication devices 14 are simply utilized for illustrating the structure of the wireless communication system 10. Practically, the network 12 may be a universal terrestrial radio access network (UTRAN) including at least one Node-B (NB) in a universal mobile telecommunications system (UMTS). In one example, the network 12 may be an evolved UTRAN (E-UTRAN) including at least one evolved NB (eNB) and/or at least one relay node in a long term evolution (LTE) system, an LTE-Advanced (LTE-A) system, an evolution of the LTE-A system, etc. In one example, the network 12 may be a next generation radio access network (NG-RAN) including at least one next generation Node-B (gNB) and/or at least one fifth generation (5G) base station (BS). In one example, the network 12 may be any BS conforming to a specific communication standard to communicate with a communication device 14.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network 12 may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network 12 receives information transmitted by a communication device 14, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device 14 may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network 12 and the communication device 14 can be seen as a transmitter or a receiver according to direction (i.e., transmission direction), e.g., for an uplink (UL), the communication device 14 is the transmitter and the network 12 is the receiver, and for a downlink (DL), the network 12 is the transmitter and the communication device 14 is the receiver.

Figure 2:
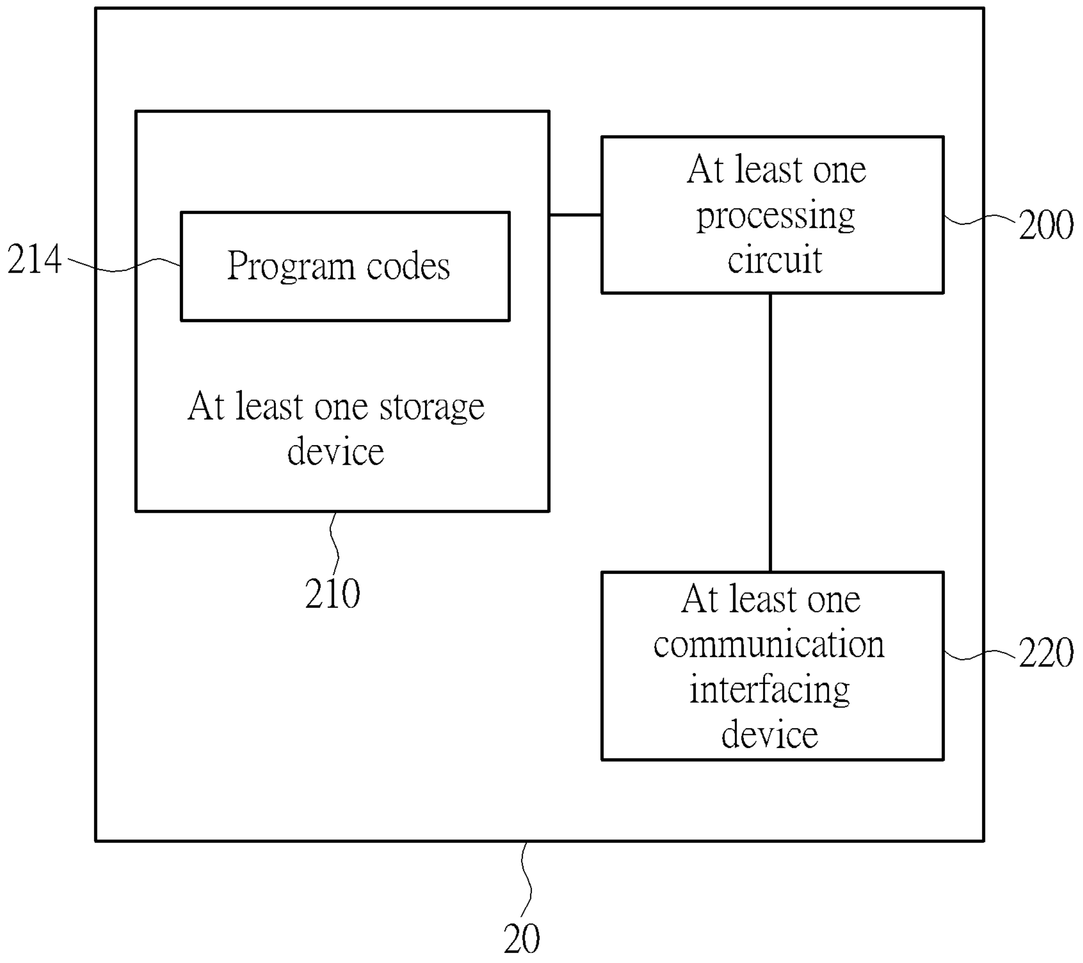
FIG. 2 is a schematic diagram of a communication device according to an example of the present invention.

FIG. 2 is a schematic diagram of a communication device 20 according to an example of the present invention. The communication device 20 may be a communication device 14 or the network 12 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include, but are not limited to, a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
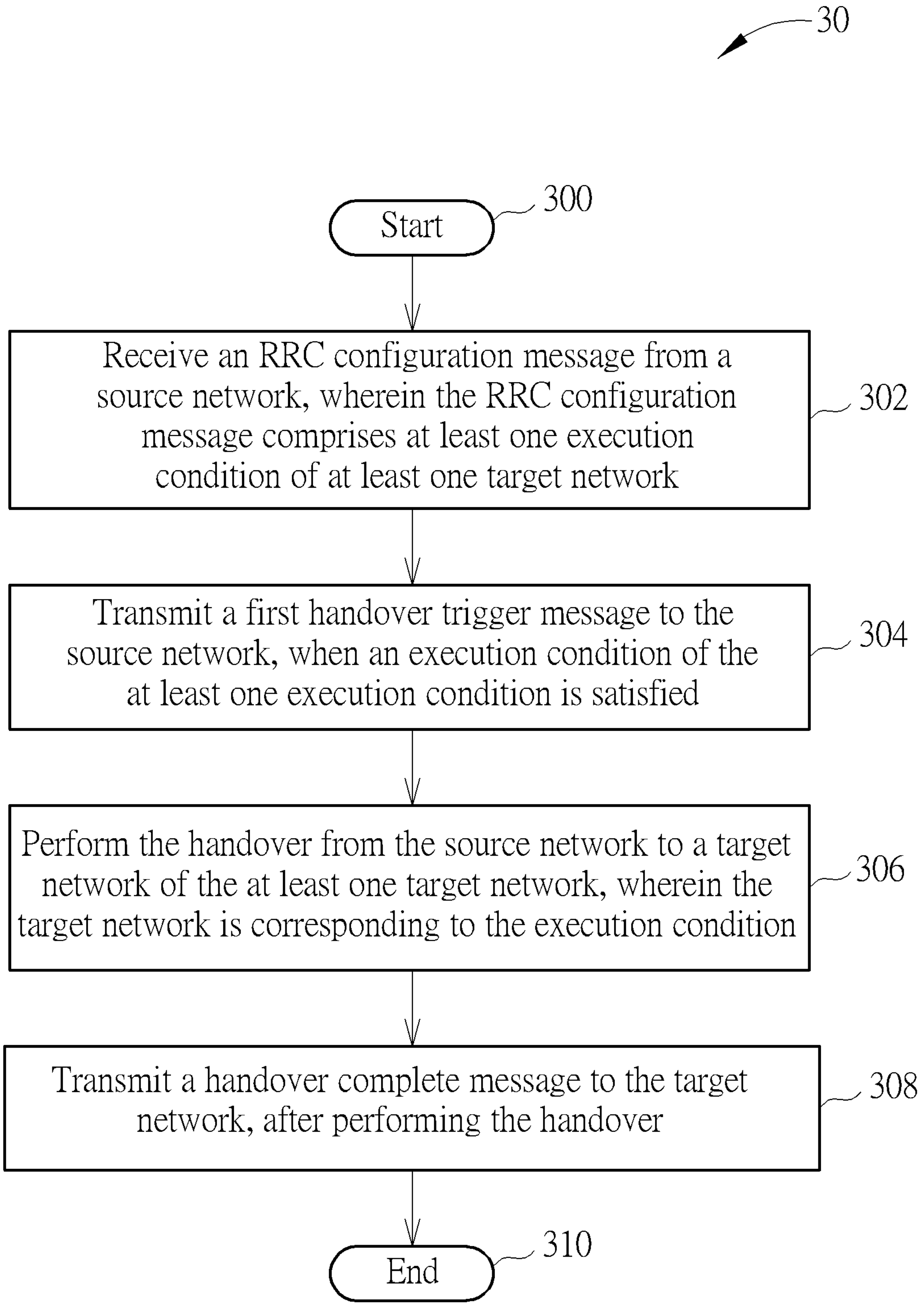
FIG. 3 is a flowchart of a process according to an example of the present invention.

FIG. 3 is a flowchart of a process 30 according to an example of the present invention. The process 30 may be utilized in a communication device (e.g., the communication device 20 in FIG. 2), to handle a handover. The process 30 may be compiled into the program codes 214 and includes the following steps:

Step 300: Start.

Step 302: Receive a radio resource control (RRC) configuration message from a source network, wherein the RRC configuration message comprises at least one execution condition of at least one target network.

Step 304: Transmit a first handover trigger message to the source network, when an execution condition of the at least one execution condition is satisfied.

Step 306: Perform the handover from the source network to a target network of the at least one target network, wherein the target network is corresponding to the execution condition.

Step 308: Transmit a handover complete message to the target network, after performing the handover.

Step 310: End.

According to the process 30, the communication device 20 receives an RRC configuration message from a source network. The RRC configuration message comprises at least one execution condition of at least one target network. The at least one execution condition is corresponding to the at least one target network, respectively. Then, the communication device 20 transmits a first handover trigger message to the source network, when an execution condition of the at least one execution condition is satisfied. The communication device 20 performs the handover (e.g., a dual active protocol stack (DAPS) handover) from the source network to a target network of the at least one target network, after transmitting the first handover trigger message. The target network is corresponding to the execution condition. The communication device 20 transmits a handover complete message to the target network, after performing the handover (successfully). Thus, the handover is performed robustly with the execution condition(s) in the high frequency, and the low handover interruption time can be achieved.

Realization of the process 30 is not limited to the above description. The following examples may be applied to realize the process 30.

In one example, the communication device 20 verifies the at least one execution condition in the RRC configuration message, after receiving the RRC configuration message. In one example, the communication device 20 transmits a measurement report (e.g., for the target network) as the first handover trigger message to the source network, when the execution condition is satisfied. That is, the communication device 20 informs the source network that the handover from the source network to the target network is triggered via the measurement report. In one example, the communication device 20 keeps connecting to the source network, when performing the handover.

In one example, the communication device 20 starts a first timer (e.g., a T304 timer), after transmitting the first handover trigger message to the source network. In one example, the communication device 20 stops the first timer, after transmitting the handover complete message to the target network (successfully). It should be noted that the communication device 20 determines whether a failure of the handover occurs according to (e.g., by maintaining) the first timer.

In one example, the source network transmits first downlink (DL) data to the target network, after transmitting the RRC configuration message to the communication device 20. In one example, the source network transmits the first DL data or a second handover trigger message to the target network in response to the first handover trigger message. That is, the source network informs the target network that the handover is triggered via the second DL data or the second handover trigger message. In one example, the second handover trigger message comprises the first handover trigger message. In one example, the second handover trigger message and the first handover trigger message are the same.

In one example, the target network processes the first DL data (e.g., compresses a header, ciphers and/or adds a packet data convergence protocol (PDCP) header), to generate second DL data. In one example, the target network transmits the second DL data to the communication device 20 (immediately), after receiving the handover complete message. In one example, the target network transmits a handover success message to the source network in response to the handover complete message.

In one example, the target network starts a second timer (e.g., a timer for the target network to detect a failure of the handover, hereafter referred to as a T-HF timer) in response to the second DL data or the second handover trigger message. In one example, the target network stops the second timer in response to the handover complete message. In one example, a value of the second timer is not smaller than the value of the first timer.

In one example, the source network starts a third timer (e.g., a T304-like timer) in response to the first handover trigger message. In one example, the source network stops the third timer in response to the handover success message. In one example, a value of the third timer is greater than the value of the first timer. That is, the source network determines whether the failure of the handover occurs according to (e.g., by maintaining) the third timer.

In one example, the source network transmits a handover request message to the at least one target network. In one example, the at least one target network transmits at least one handover acknowledgement (ACK) message to the source network in response to the handover request message, respectively. In one example, the at least one handover ACK message comprises at least one RRC configuration of the at least one target network, respectively. In one example, the at least one ACK message comprises a value of the first timer. In one example, the first handover trigger message comprises the value of the first timer. In one example, the first handover trigger message comprises an identity (ID) information of the target network.

In one example, the RRC configuration message comprises an RRC configuration of the target network, and the RRC configuration comprises a DAPS configuration. It should be noted that the communication device 20 transmits the first handover trigger message to the source network, if the RRC configuration comprises the DAPS configuration. The communication device 20 does not (need to) transmit the first handover trigger message, if the RRC configuration does not comprise the DASP configuration. In one example, the RRC configuration message comprises the at least one RRC configuration of the at least one target network, and the at least one RRC configuration is corresponding to the at least one execution condition, respectively. In one example, the RRC configuration is one of the at least one RRC configuration.

FIG. 4 is a schematic diagram of an RRC configuration message 40 according to an example of the present invention. The RRC configuration message 40 comprises execution conditions ExCond1-ExCond3 of target networks TN1-TN3 and RRC configurations RRCReconfig1-RRCReconfig3 of the target networks TN1-TN3. The execution conditions ExCond1-ExCond3 are corresponding to the RRC configurations RRCReconfig1-RRCReconfig3, respectively. The RRC configurations RRCReconfig2-RRCReconfig3 comprise a DAPS configuration DAPS_config. That is, the RRC configuration message 40 comprises information of the target networks TN1-TN3, enabling a communication device to perform a handover to one of the target networks TN1-TN3. The communication device 20 verifies the execution conditions ExCond1-ExCond3 after receiving the RRC configuration message 40, and performs the handover when one of the execution conditions ExCond1-ExCond3 is satisfied. For example, the communication device 20 performs a conditional handover to the target network TN1 according to the RRC configuration RRCReconfig1, when the execution condition ExCond1 is satisfied. For example, the communication device 20 performs a DAPS handover to the target network TN2 according to the RRC configuration RRCReconfig2, when the execution condition ExCond2 is satisfied. It should be noted that the communication device 20 performs the DAPS handover, if the RRC configuration comprises the DAPS configuration DAPS_config (e.g., one of the RRC configurations RRCReconfig2-RRCReconfig3). The communication device 20 performs the conditional handover or a normal handover, if the RRC configuration does not comprise the DAPS configuration DAPS_config (e.g., the RRC configuration RRCReconfig1).

Figure 5:
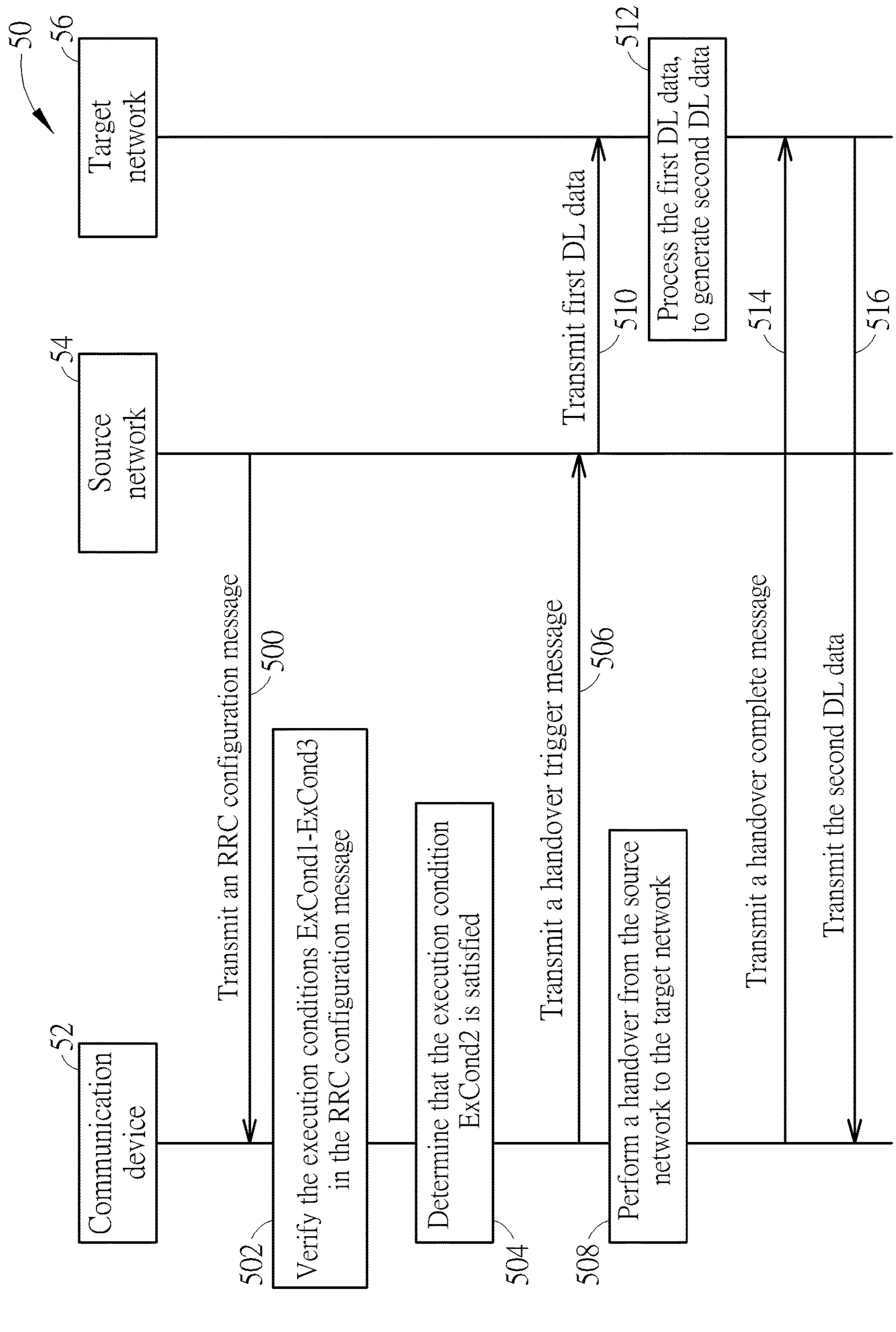
FIG. 5 is a sequence diagram of a process according to an example of the present invention.

FIG. 5 is a sequence diagram of a process 50 according to an example of the present invention. The process 50 is performed by a communication device 52 (e.g., the communication device 20 in FIG. 2), a source network 54 and a target network 56 (e.g., the target network TN2 in FIG. 4). First, the source network 54 transmits an RRC configuration message (e.g., the RRC configuration message 40 in FIG. 4) to the communication device 52 (Step 500). Taking the RRC configuration message 40 as an example, the communication device 52 verifies the execution conditions ExCond1-ExCond3 in the RRC configuration message 40 after receiving the RRC configuration message 40 (Step 502), and determines that the execution condition ExCond2 is satisfied (Step 504). The execution condition ExCond2 is corresponding to the target network. The communication device 52 transmits a handover trigger message (e.g., a measurement report of the target network) to the source network 54, when the execution condition ExCond2 is satisfied (Step 506). Then, the communication device 52 performs a handover from the source network 54 to the target network 56 (Step 508). The source network 54 transmits first DL data to the target network 56 in response to the handover trigger message (Step 510). The target network 56 processes the first DL data, to generate second DL data (Step 512). The communication device 52 transmits a handover complete message to the target network 56, after performing the handover (successfully) (Step 514). Finally, the target network 56 transmits the second DL data to the communication device 52 in response to the handover complete message (Step 516).

Figure 6:
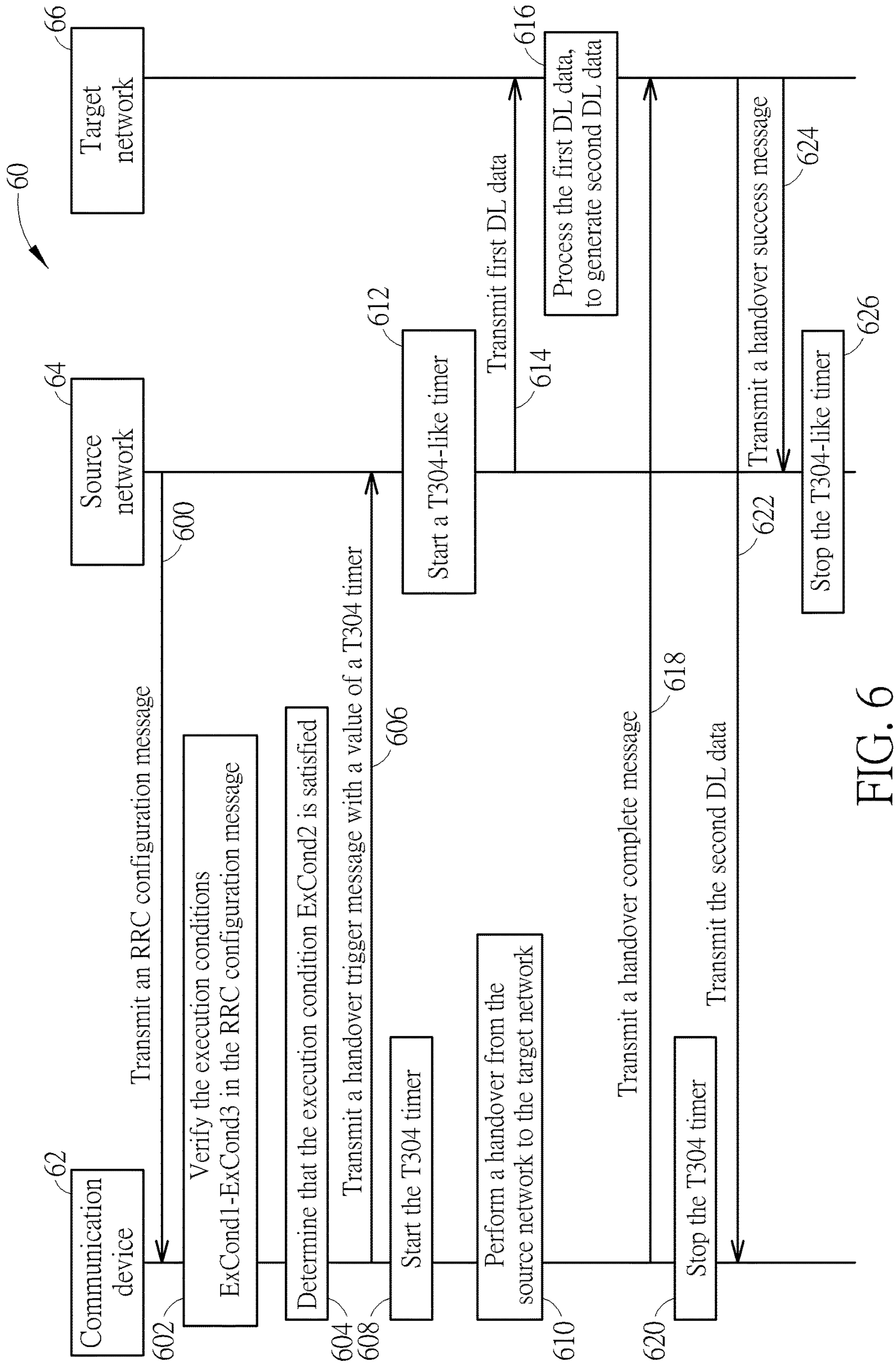
FIG. 6 is a sequence diagram of a process according to an example of the present invention.

FIG. 6 is a sequence diagram of a process 60 according to an example of the present invention. The process 60 is performed by a communication device 62 (e.g., the communication device 20 in FIG. 2), a source network 64 and a target network 66 (e.g., the target network TN2 in FIG. 4). First, the source network 64 transmits an RRC configuration message (e.g., the RRC configuration message 40 in FIG. 4) to the communication device 62 (Step 600). Taking the RRC configuration message 40 as an example, the communication device 62 verifies the execution conditions ExCond1-ExCond3 in the RRC configuration message 40 after receiving the RRC configuration message 40 (Step 602), and determines that the execution condition ExCond2 is satisfied (Step 604). The execution condition ExCond2 is corresponding to the target network 60. The communication device 62 transmits a handover trigger message with a value of a T304 timer to the source network 64, when the execution condition ExCond2 is satisfied (Step 606).

Then, the communication device 62 starts the T304 timer after transmitting the handover trigger message to the source network 64 (Step 608), and performs a handover from the source network 64 to the target network 66 (Step 610). The source network 64 starts a T304-like timer and transmits first DL data, in response to the handover trigger message (Steps 612 and 614). The target network 66 processes the first DL data, to generate second DL data (Step 616). The communication device 62 transmits a handover complete message to the target network 66, after performing the handover (successfully) (Step 618). The communication device 62 stops the T304 timer, after transmitting the handover complete message to the target network 66 (successfully) (Step 620). The target network 66 transmits the second DL data to the communication device 62 and transmits a handover success message to the source network 64, in response to the handover complete message (Steps 622 and 624). Finally, the source network 64 stops the T304-like timer in response to the handover success message (Step 626).

Figure 7:
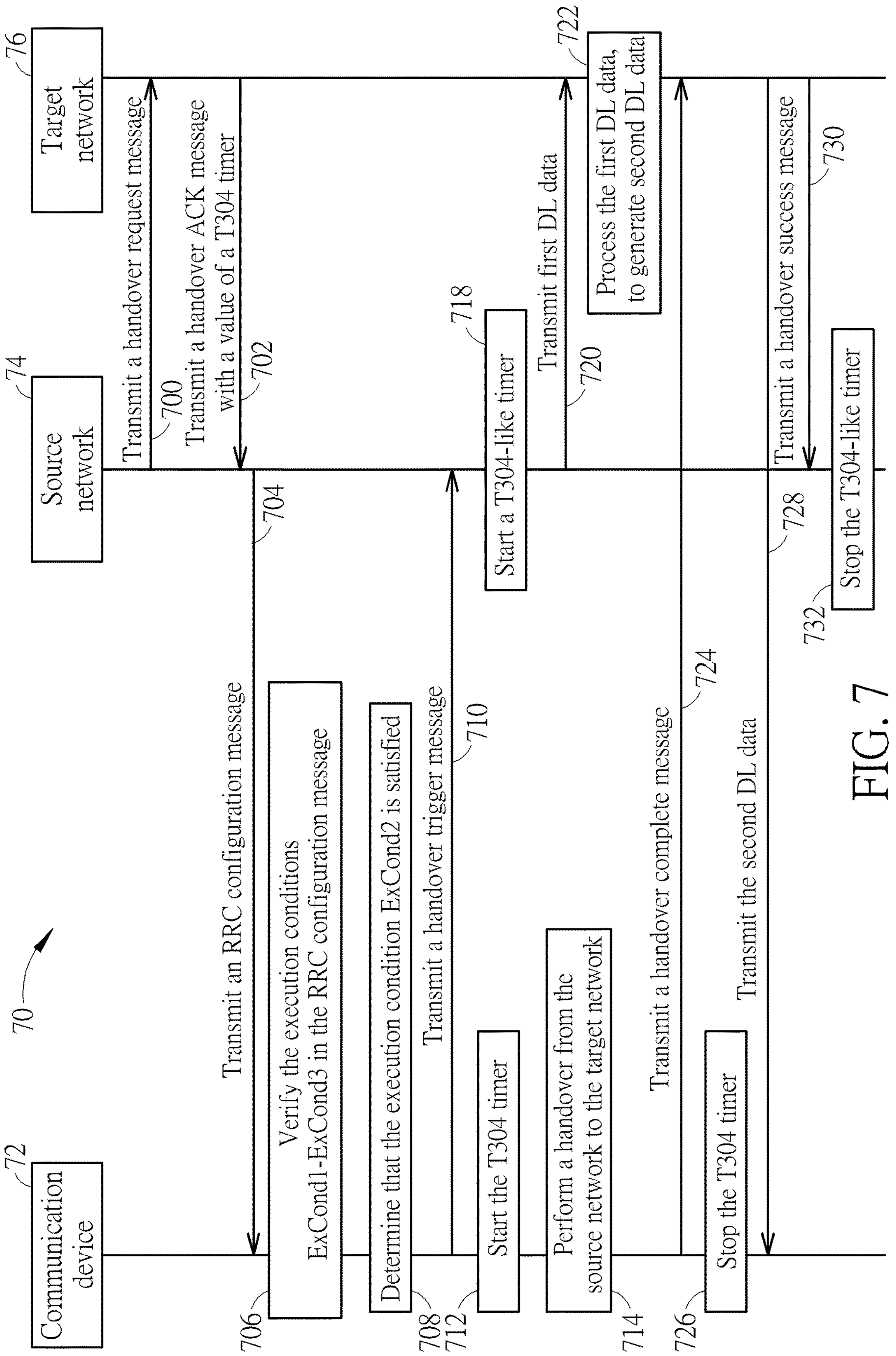
FIG. 7 is a sequence diagram of a process according to an example of the present invention.

FIG. 7 is a sequence diagram of a process 70 according to an example of the present invention. The process 70 is performed by a communication device 72 (e.g., the communication device 20 in FIG. 2), a source network 74 and a target network 76 (e.g., the target network TN2 in FIG. 4). First, the source network 74 transmits a handover request message to the target network 76 (Step 700), and the target network 76 transmits a handover ACK message with a value of a T304 timer to the source network 74 in response to the handover request message (Step 702). It should be noted that the source network 74 transmits the handover request message to all target networks (e.g., the target networks TN1-TN3 in FIG. 4), and each of the target networks transmits one handover ACK message to the source network 74 in response to the handover request message (not shown). The source network 74 transmits an RRC configuration message (e.g., the RRC configuration message 40 in FIG. 4) to the communication device 72 in response to the handover ACK message (Step 704). Taking the RRC configuration message 40 as an example, the communication device 72 verifies the execution conditions ExCond1-ExCond3 in the RRC configuration message 40 after receiving the RRC configuration message 40 (Step 706), and determines that the execution condition ExCond2 is satisfied (Step 708). The execution condition ExCond2 is corresponding to the target network 76. The communication device 72 transmits a handover trigger message to the source network 74, when the execution condition ExCond2 is satisfied (Step 710).

Then, the communication device 72 starts the T304 timer, after transmitting the handover trigger message to the source network 74 (Step 712), and performs a handover from the source network 74 to the target network 76 (Step 714). The source network 74 starts a T304-like timer and transmits first DL data, in response to the handover trigger message (Steps 718 and 720). The target network 76 processes the first DL data, to generate second DL data (Step 722). The communication device 72 transmits a handover complete message to the target network 76, after performing the handover (successfully) (Step 724). The communication device 72 stops the T304 timer, after transmitting the handover complete message to the target network 76 (successfully) (Step 726). The target network 76 transmits the second DL data to the communication device 72 and transmits a handover success message to the source network 74, in response to the handover complete message (Steps 728 and 730). Finally, the source network 74 stops the T304-like timer in response to the handover success message (Step 732).

The processes 50-70 are the cases that the handover is performed successfully. In processes 60-70, the communication device 62/72 determines whether the failure of the handover occurs according to the T304 timer, and the source network 64/74 determines whether the failure of the handover occurs according to the T304-like timer. In the process 60, the communication device 62 informs the source network 64 of the value of the T304 timer via the handover trigger message. In the process 70, the target network 76 informs the source network 74 of the value of the T304 timer via the handover ACK message. In the process 70, the source network 74 transmits the handover request message to all target networks (e.g., the target networks TN1-TN3 in FIG. 4), and each of the target networks transmits one handover ACK message to the source network 74 in response to the handover request message (not shown).

Figure 8:
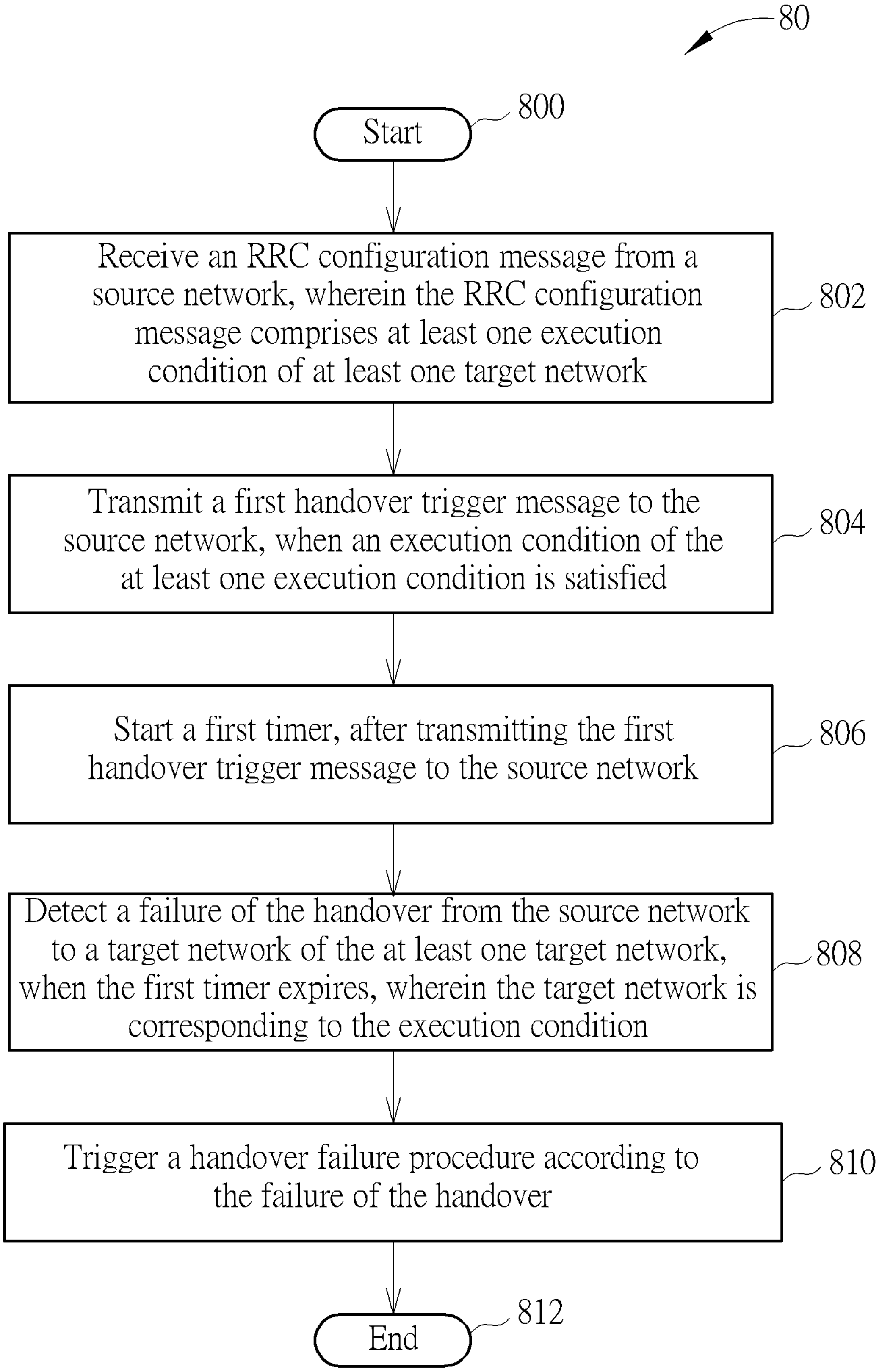
FIG. 8 is a flowchart of a process according to an example of the present invention.

FIG. 8 is a flowchart of a process 80 according to an example of the present invention. The process 80 may be utilized in a communication device (e.g., the communication device 20 in FIG. 2), to handle a handover. The process 80 may be compiled into the program codes 214 and includes the following steps:

Step 800: Start.

Step 802: Receive an RRC configuration message from a source network, wherein the RRC configuration message comprises at least one execution condition of at least one target network.

Step 804: Transmit a first handover trigger message to the source network, when an execution condition of the at least one execution condition is satisfied.

Step 806: Start a first timer, after transmitting the first handover trigger message to the source network.

Step 808: Detect a failure of the handover from the source network to a target network of the at least one target network, when the first timer expires, wherein the target network is corresponding to the execution condition.

Step 810: Trigger a handover failure procedure according to the failure of the handover.

Step 812: End.

According to the process 80, the communication device 20 receives an RRC configuration message from a source network. The RRC configuration message comprises at least one execution condition of at least one target network. The at least one execution condition is corresponding to the at least one target network, respectively. Then, the communication device 20 transmits a first handover trigger message to the source network, when an execution condition of the at least one execution condition is satisfied. The communication device 20 starts a first timer (e.g., a T304 timer), after transmitting the first handover trigger message to the source network. The communication device 20 detects a failure of the handover (e.g., a DAPS handover) from the source network to a target network of the at least one target network, when the first timer expires. The target network is corresponding to the execution condition. Then, the communication device 20 triggers a handover failure procedure according to the failure of the handover. That is, the communication device 20 determines whether the failure of the handover occurs according to (e.g., by maintaining) the first timer, to trigger the handover failure procedure when the failure of the handover occurs. Thus, the communication device 20 can handle the failed handover in the high frequency.

Realization of the process 80 is not limited to the above description. The following examples may be applied to realize the process 80.

In one example, the communication device 20 verifies the at least one execution condition in the RRC configuration message, after receiving the RRC configuration message. In one example, the communication device 20 transmits a measurement report as the first handover trigger message to the source network, when the execution condition is satisfied. That is, the communication device 20 informs the source network that the handover is triggered via the measurement report.

In one example, the source network transmits DL data to the target network, after transmitting the RRC configuration message to the communication device 20. In one example, the source network transmits the DL data or a second handover trigger message to the target network in response to the first handover trigger message. That is, the source network informs the target network that the handover is triggered via the second DL data or the second handover trigger message. In one example, the second handover trigger message comprises the first handover trigger message. In one example, the second handover trigger message and the first handover trigger message are the same.

There are various ways to trigger the handover failure procedure. In one example, the communication device 20 declares a radio link failure (RLF) between the communication device 20 and the source network, after starting the first timer. In one example, the communication device 20 triggers a reestablishment procedure, after declaring the RLF. That is, the communication device 20 detects the RLF after starting the first timer, and triggers the reestablishment procedure according to the RLF. In one example, the communication device 20 transmits a handover failure information indicating the failure of the handover to the source network, when the first timer expires and the communication device 20 does not declare the RLF between the communication device 20 and the source network.

In one example, the source network transmits a handover finish message to the target network in response to the handover failure information. In one example, the source network stops transmitting the DL data in response to the handover failure information.

In one example, the target network starts a second timer (e.g., a T-HF timer) in response to the DL data or the second handover trigger message. In one example, the target network transmits the handover finish message to the source network, when the second timer expires. That is, the target network determines that the failure of the handover occurs and informs the source network of the failure of the handover, when the second timer expires. In one example, the target network starts the second timer in response to the DL data or the second handover trigger message. In one example, the target network stops the second timer in response to the handover finish message. In one example, a value of the second timer is not smaller than the value of the first timer.

In one example, the source network starts a third timer (e.g., a T304-like timer) in response to the first handover trigger message. In one example, the source network stops transmitting the DL data and transmits the handover finish message to the target network, when the third timer expires. That is, the source network determines that the failure of the handover occurs and informs the target network of the failure of the handover, when the third timer expires. In one example, the source network stops the third timer in response to the handover failure information. In one example, a value of the third timer is greater than the value of the first timer.

In one example, the at least one target network receives a handover request message from the source network. In one example, the at least one target network transmits at least one handover ACK message to the source network in response to the handover request message, respectively. In one example, the at least one handover ACK message comprises at least one RRC configuration of the at least one target network, respectively. In one example, the at least one handover ACK message comprises a value of the first timer. In one example, the first handover trigger message comprises the value of the first timer. In one example, the first handover trigger message comprises an ID information of the target network.

In one example, the RRC configuration message comprises an RRC configuration of the target network, and the RRC configuration comprises a DAPS configuration. It should be noted that the communication device 20 transmits the first handover trigger message to the source network, if the RRC configuration comprises the DAPS configuration. The communication device 20 does not (need to) transmit the first handover trigger message, if the RRC configuration does not comprise the DASP configuration. In one example, the RRC configuration message comprises the at least one RRC configuration of the at least one target network, and the at least one RRC configuration is corresponding to the at least one execution condition, respectively. In one example, the RRC configuration is one of the at least one RRC configuration.

Figure 9:
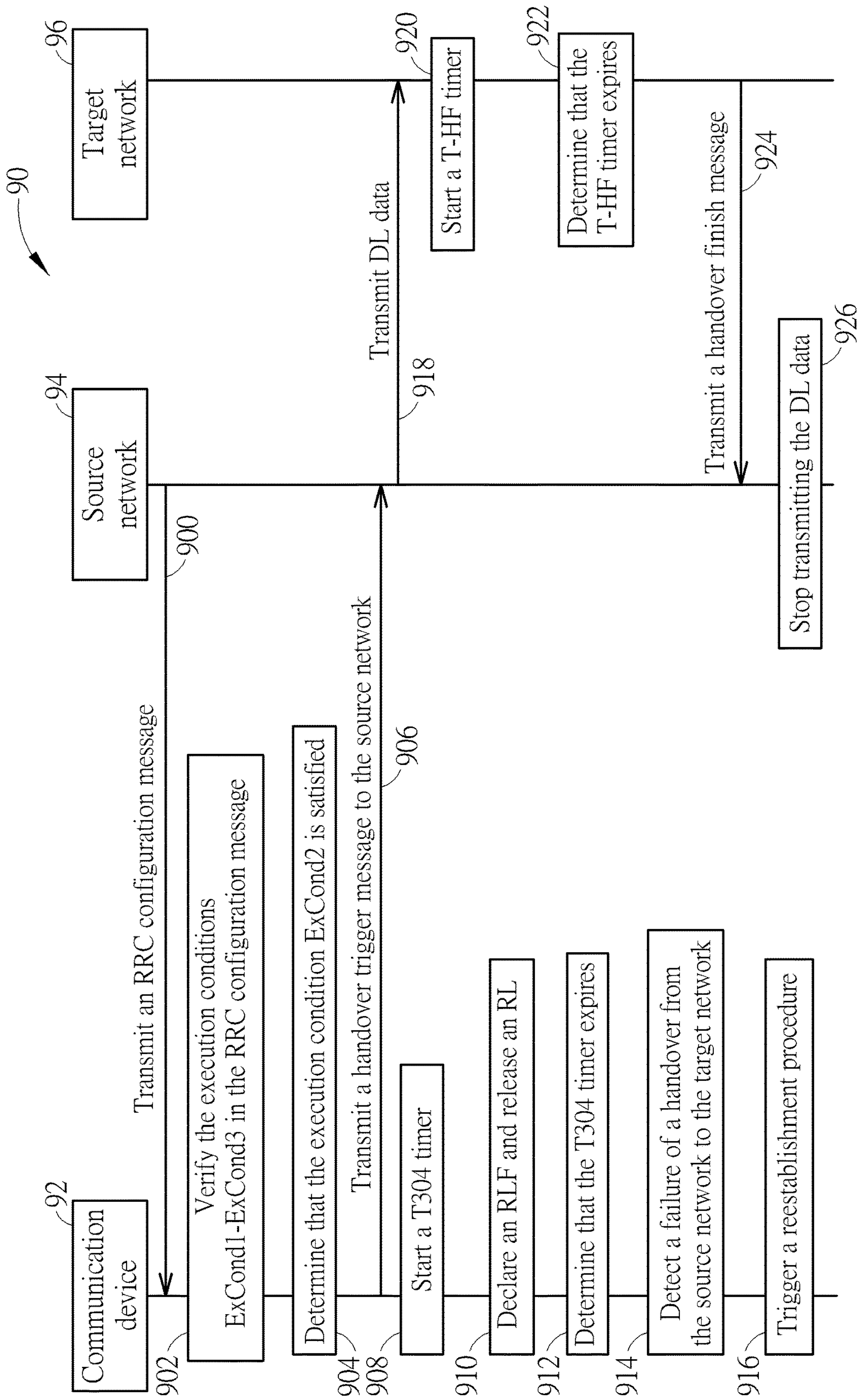
FIG. 9 is a sequence diagram of a process according to an example of the present invention.

FIG. 9 is a sequence diagram of a process 90 according to an example of the present invention. The process 90 is performed by a communication device 92 (e.g., the communication device 20 in FIG. 2), a source network 94 and a target network 96 (e.g., the target network TN2 in FIG. 4). First, the source network 94 transmits an RRC configuration message (e.g., the RRC configuration message 40 in FIG. 4) to the communication device 92 (Step 900). Taking the RRC configuration message 40 as an example, the communication device 92 verifies the execution conditions ExCond1-ExCond3 in the RRC configuration message 40 after receiving the RRC configuration message 40 (Step 902), and determines that the execution condition ExCond2 is satisfied (Step 904). The execution condition ExCond2 is corresponding to the target network 96. The communication device 92 transmits a handover trigger message to the source network 94, when the execution condition ExCond2 is satisfied (Step 906). The communication device 92 starts a T304 timer, after transmitting the handover trigger message to the source network 94 (Step 908).

Then, the communication device 92 declares an RLF between the communication device 92 and the source network 94 and releases a radio link (RL) between the communication device 92 and the source network 94, after starting the T304 timer (Step 910). The communication device 92 determines that the T304 timer expires (Step 912). The communication device 92 detects a failure of a handover from the source network 94 to the target network 96, when the T304 timer expires (Step 914). The communication device 92 triggers a reestablishment procedure (Step 916). The source network 94 transmits DL data to the target network 96 in response to the handover trigger message (Step 918). The target network 96 starts a T-HF timer in response to the DL data (Step 920). The target network 96 determines that the T-HF timer expires (Step 922), and transmits a handover finish message to the source network 94 when the T-HF timer expires (Step 924). Finally, the source network 94 stops transmitting the DL data in response to the handover finish message (Step 926).

Figure 10:
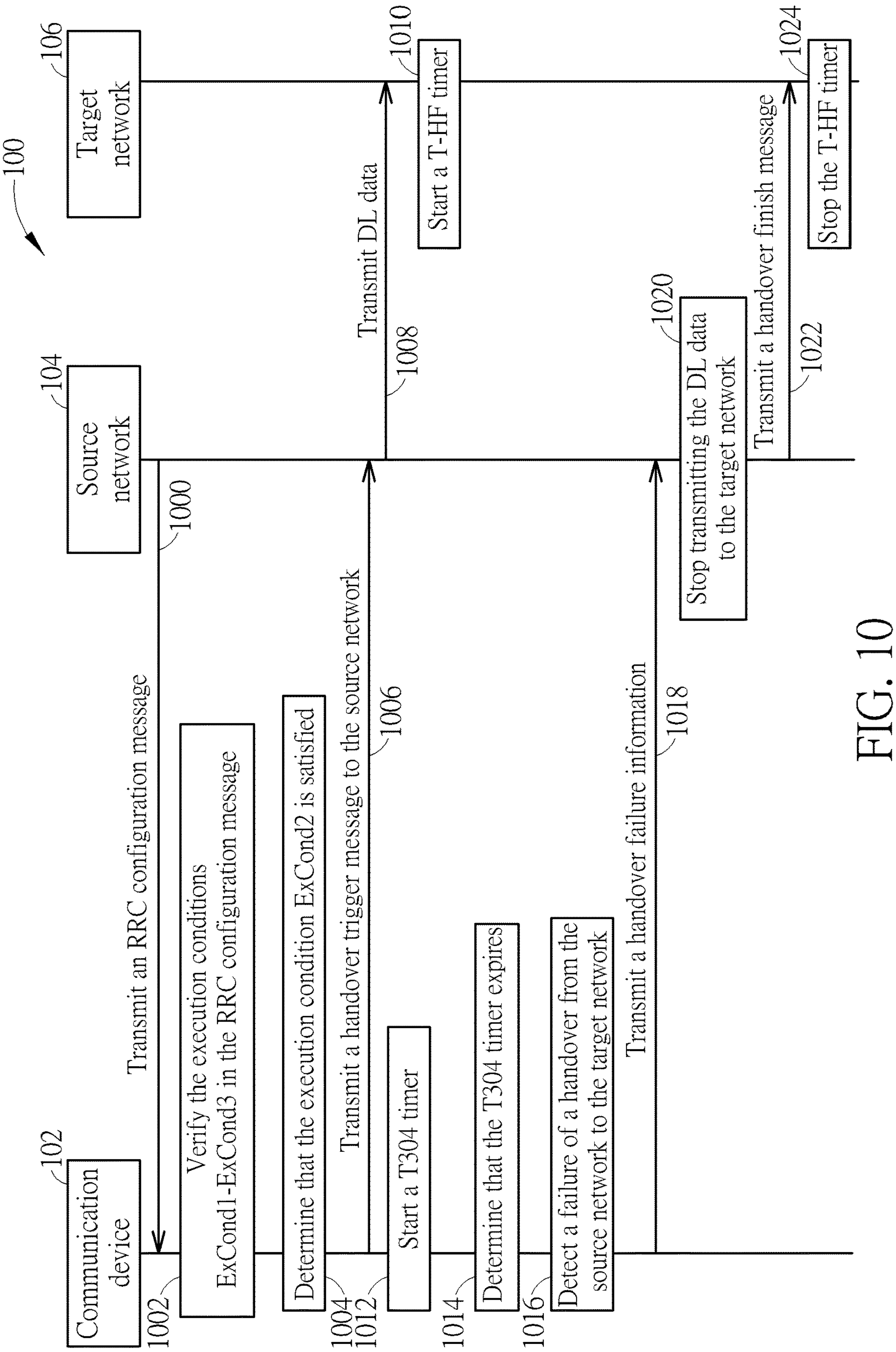
FIG. 10 is a sequence diagram of a process according to an example of the present invention.

FIG. 10 is a sequence diagram of a process 100 according to an example of the present invention. The process 100 is performed by a communication device 102 (e.g., the communication device 20 in FIG. 2), a source network 104 and a target network 106 (e.g., the target network TN2 in FIG. 4). First, the source network 104 transmits an RRC configuration message (e.g., the RRC configuration message 40 in FIG. 4) to the communication device 102 (Step 1000). Taking the RRC configuration message 40 as an example, the communication device 102 verifies the execution conditions ExCond1-ExCond3 in the RRC configuration message 40 after receiving the RRC configuration message 40 (Step 1002), and determines that the execution condition ExCond2 is satisfied (Step 1004). The execution condition ExCond2 is corresponding to the target network 106. The communication device 102 transmits a handover trigger message to the source network 104, when the execution condition ExCond2 is satisfied (Step 1006).

Then, the source network 104 transmits DL data to the target network 106 in response to the handover trigger message (Step 1008), and the target network 106 starts a T-HF timer in response to the DL data (Step 1010). The communication device 102 starts a T304 timer, after transmitting the handover trigger message to the source network 104 (Step 1012). The communication device 102 determines that the T304 timer expires (Step 1014). The communication device 102 detects a failure of a handover from the source network 104 to the target network 106, when the T304 timer expires (Step 1016). The communication device 102 transmits a handover failure information to the source network 104, when the T304 timer expires and the communication device 102 does not declare the RLF between the communication device 102 and the source network 104 (Step 1018). The source network 104 stops transmitting the DL data to the target network 106 and transmits a handover finish message to the source network 104, in response to the handover failure information (Steps 1020 and 1022). Finally, the target network 106 stops the T-HF timer in response to the handover finish message (Step 1024).

Figure 11:
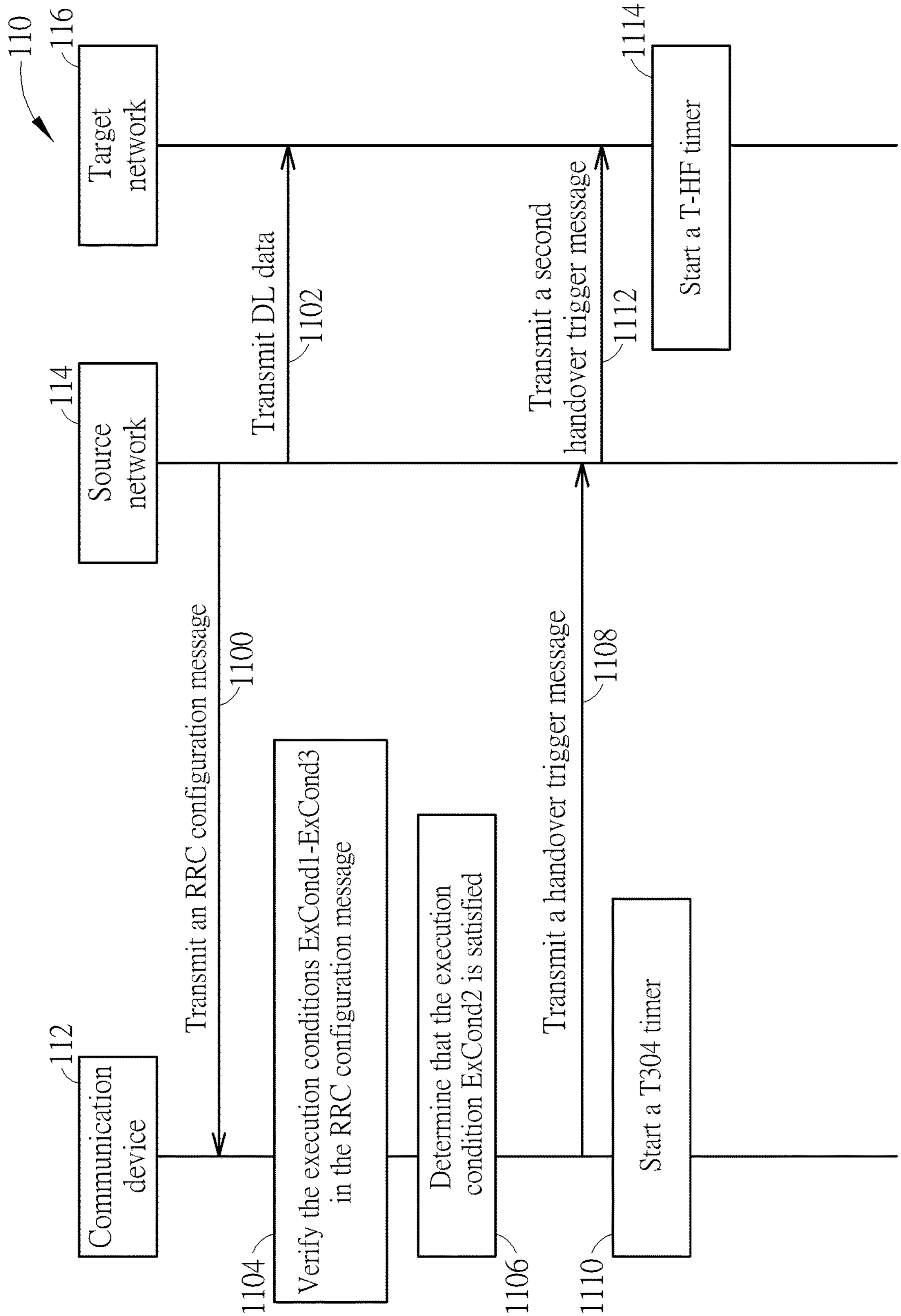
FIG. 11 is a sequence diagram of a process according to an example of the present invention.

FIG. 11 is a sequence diagram of a process 110 according to an example of the present invention. The process 110 is performed by a communication device 112 (e.g., the communication device 20 in FIG. 2), a source network 114 and a target network 116 (e.g., the target network TN2 in FIG. 4). First, the source network 114 transmits an RRC configuration message (e.g., the RRC configuration message 40 in FIG. 4) to the communication device 112 (Step 1100), and transmits DL data to the target network 116 (Step 1102). Taking the RRC configuration message 40 as an example, the communication device 112 verifies the execution conditions ExCond1-ExCond3 in the RRC configuration message 40 after receiving the RRC configuration message 40

(Step 1104), and determines that the execution condition ExCond2 is satisfied (Step 1106). The execution condition ExCond2 is corresponding to the target network 116. The communication device 112 transmits a first handover trigger message to the source network 114, when the execution condition ExCond2 is satisfied (Step 1108).

Then, the communication device 112 starts a T304 timer, after transmitting the handover trigger message to the source network 114 (Step 1110). The source network 114 transmits a second handover trigger message to the target network 116 in response to the handover trigger message (Step 1112), and the target network 116 starts a T-HF timer in response to the second handover trigger message (Step 1114). That is, the source network 114 transmits the DL data to the target network 116 in advance, so that the target network 116 may process the DL data early. The following operations in the process 110 can be referred to the processes 90 and 100, and are not narrated herein for brevity.

Figure 12:
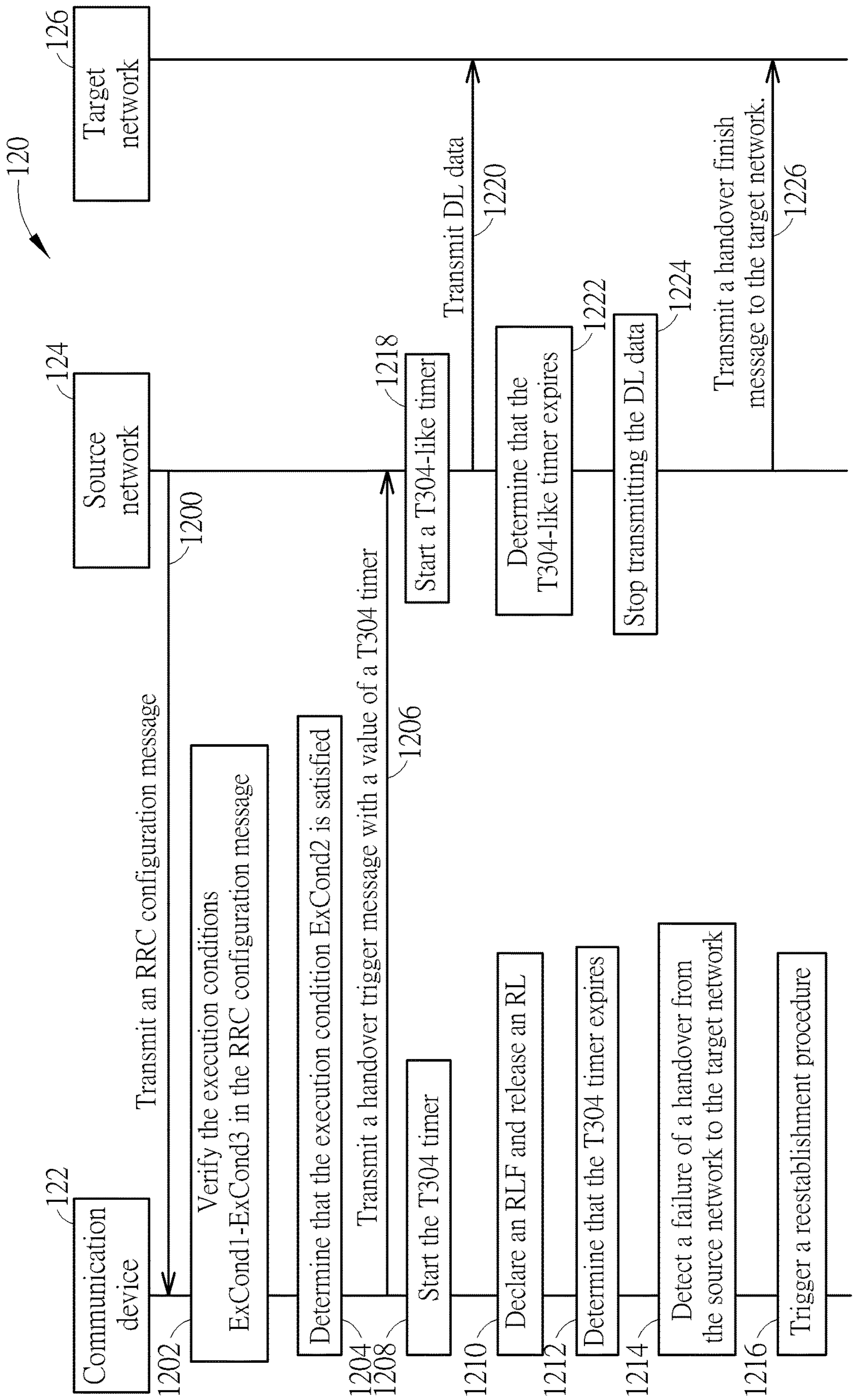
FIG. 12 is a sequence diagram of a process according to an example of the present invention.

FIG. 12 is a flowchart of a process 120 according to an example of the present invention. The process 120 is performed by a communication device 122 (e.g., the communication device 20 in FIG. 2), a source network 124 and a target network 126 (e.g., the target network TN2 in FIG. 4). First, the source network 124 transmits an RRC configuration message (e.g., the RRC configuration message 40 in FIG. 4) to the communication device 122 (Step 1200). Taking the RRC configuration message 40 as an example, the communication device 122 verifies the execution conditions ExCond1-ExCond3 in the RRC configuration message 40 after receiving the RRC configuration message 40 (Step 1202), and determines that the execution condition ExCond2 is satisfied (Step 1204). The execution condition ExCond2 is corresponding to the target network 126. The communication device 122 transmits a handover trigger message with a value of a T304 timer to the source network 124, when the execution condition ExCond2 is satisfied (Step 1206).

Then, the communication device 122 starts the T304 timer, after transmitting the handover trigger message to the source network 124 (Step 1208). The communication device 122 declares an RLF between the communication device 122 and the source network 124 and releases an RL between the communication device 122 and the source network 124, after starting the T304 timer (Step 1210). The communication device 122 determines that the T304 timer expires (Step 1212). The communication device 122 detects a failure of a handover from the source network 124 to the target network 126, when the T304 timer expires (Step 1214). The communication device 122 triggers a reestablishment procedure (Step 1216). The source network 124 starts a T304-like timer and transmits DL data to the target network 126, in response to the handover trigger message (Steps 1218 and 1220). The source network 124 determines that the T304-like timer expires (Step 1222). Finally, the source network 124 stops transmitting the DL data and transmits a handover finish message to the target network 126, when the T304-like timer expires (Steps 1224 and 1226).

Figure 13:
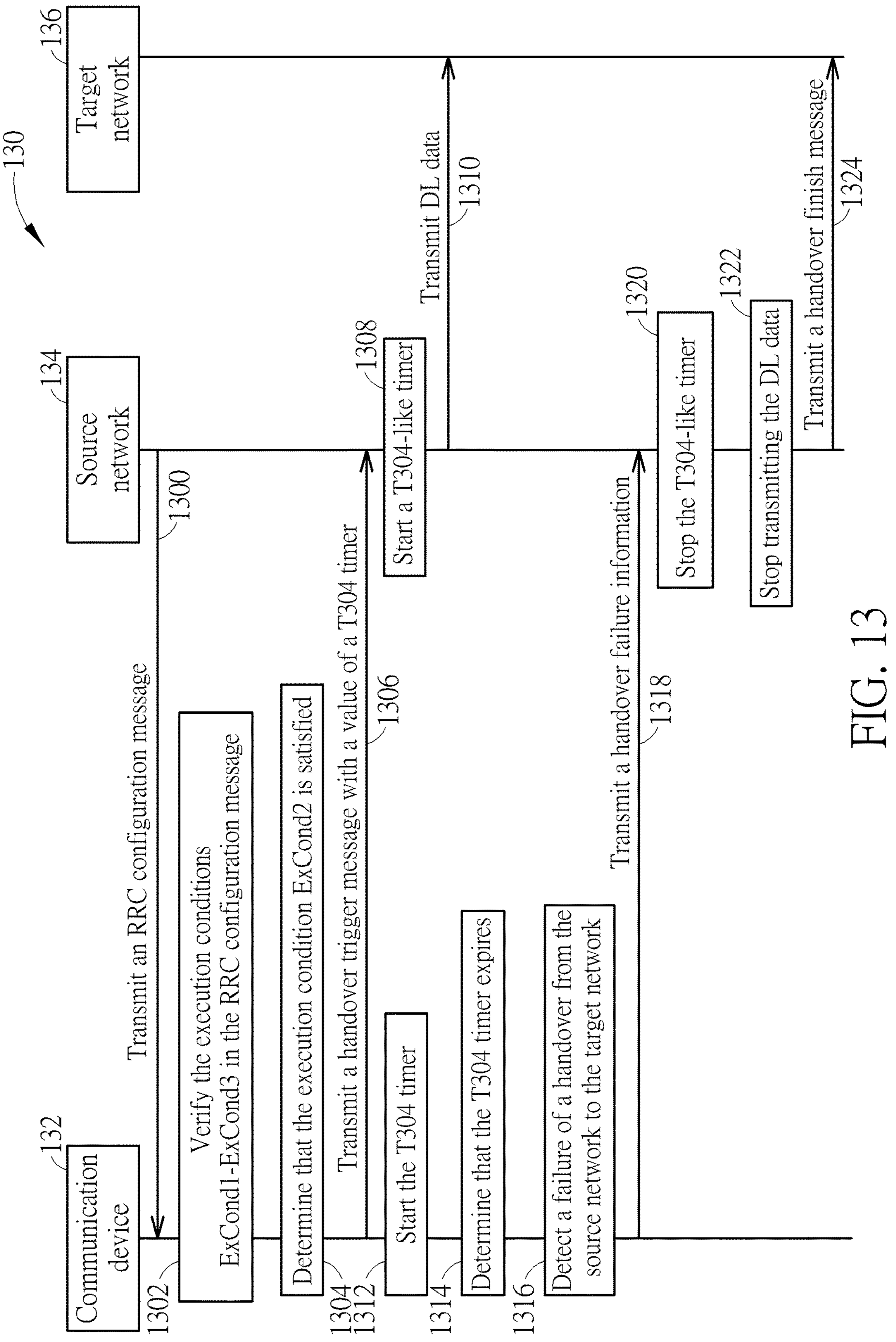
FIG. 13 is a sequence diagram of a process according to an example of the present invention.

FIG. 13 is a sequence diagram of a process 130 according to an example of the present invention. The process 130 is performed by a communication device 132 (e.g., the communication device 20 in FIG. 2), a source network 134 and a target network 136 (e.g., the target network TN2 in FIG. 4). First, the source network 134 transmits an RRC configuration message (e.g., the RRC configuration message 40 in FIG. 4) to the communication device 132 (Step 1300). Taking the RRC configuration message 40 as an example, the communication device 132 verifies the execution conditions ExCond1-ExCond3 in the RRC configuration message 40 after receiving the RRC configuration message 40 (Step 1302), and determines that the execution condition ExCond2 is satisfied (Step 1304). The execution condition ExCond2 is corresponding to the target network 136. The communication device 132 transmits a handover trigger message with a value of a T304 timer to the source network 134, when the execution condition ExCond2 is satisfied (Step 1306).

Then, the source network 134 starts a T304-like timer and transmits DL data to the target network 136, in response to the handover trigger message (Steps 1308 and 1310). The communication device 132 starts the T304 timer, after transmitting the handover trigger message to the source network 134 (Step 1312). The communication device 132 determines that the T304 timer expires (Step 1314). The communication device 132 detects a failure of a handover from the source network 134 to the target network 136, when the T304 timer expires (Step 1316). The communication device 132 transmits a handover failure information to the source network 134, when the T304 timer expires and the communication device 132 does not declare the RLF between the communication device 132 and the source network 134 (Step 1318). Finally, the source network 134 stops the T304-like timer, stops transmitting the DL data to the target network 136 and transmits a handover finish message to the source network 134, in response to the handover failure message (Steps 1320, 1322 and 1324).

Figure 14:
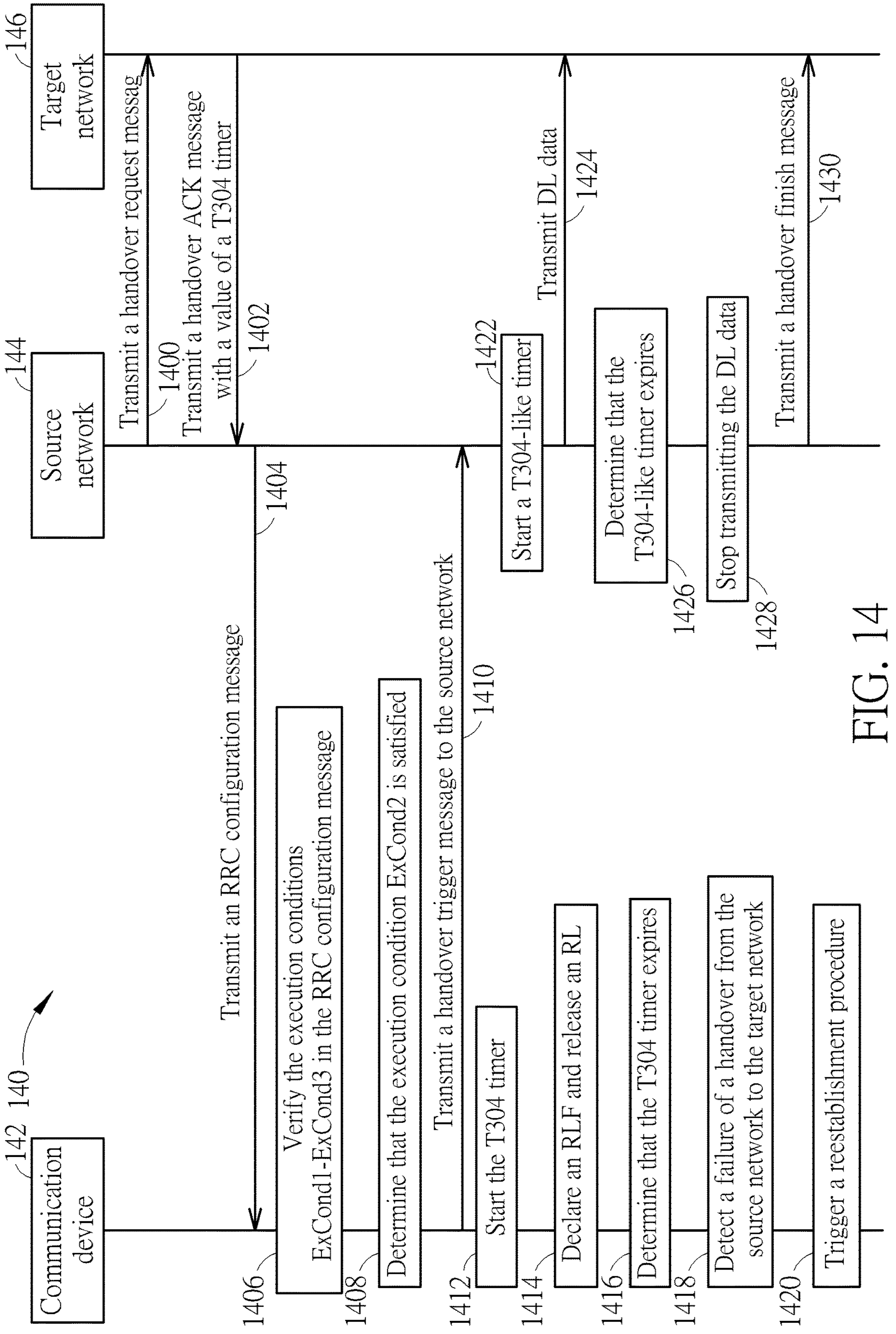
FIG. 14 is a sequence diagram of a process according to an example of the present invention.

FIG. 14 is a sequence diagram of a process 140 according to an example of the present invention. The process 140 is performed by a communication device 142 (e.g., the communication device 20 in FIG. 2), a source network 144 and a target network 146 (e.g., the target network TN2 in FIG. 4). First, the source network 144 transmits a handover request message to the target network 146 (Step 1400), and the target network 146 transmits a handover ACK message with a value of a T304 timer to the source network 144 in response to the handover request message (Step 1402). The source network 144 transmits an RRC configuration message (e.g., the RRC configuration message 40 in FIG. 4) to the communication device 142 in response to the handover ACK message (Step 1404). Taking the RRC configuration message 40 as an example, the communication device 142 verifies the execution conditions ExCond1-ExCond3 in the RRC configuration message 40 after receiving the RRC configuration message 40 (Step 1406), and determines that the execution condition ExCond2 is satisfied (Step 1408). The execution condition ExCond2 is corresponding to the target network 146. The communication device 142 transmits a handover trigger message to the source network 144, when the execution condition ExCond2 is satisfied (Step 1410).

Then, the communication device 142 starts the T304 timer, after transmitting the handover trigger message to the source network 144 (Step 1412). The communication device 142 declares an RLF between the communication device 142 and the source network 144 and releases an RL between the communication device 142 and the source network 144, after starting the T304 timer (Step 1414). The communication device 142 determines that the T304 timer expires (Step 1416). The communication device 142 detects a failure of a handover from the source network 144 to the target network 146, when the T304 timer expires (Step 1418). The communication device 142 triggers a reestablishment procedure (Step 1420). The source network 144 starts a T304-like timer and transmits DL data to the target network 146, in response to the handover trigger message (Steps 1422 and 1424). The source network 144 determines that the T304-like timer expires (Step 1426). Finally, the source network 144 stops transmitting the DL data and transmits a handover finish message to the target network 146, when the T304-like timer expires (Steps 1428 and 1430).

Figure 15:
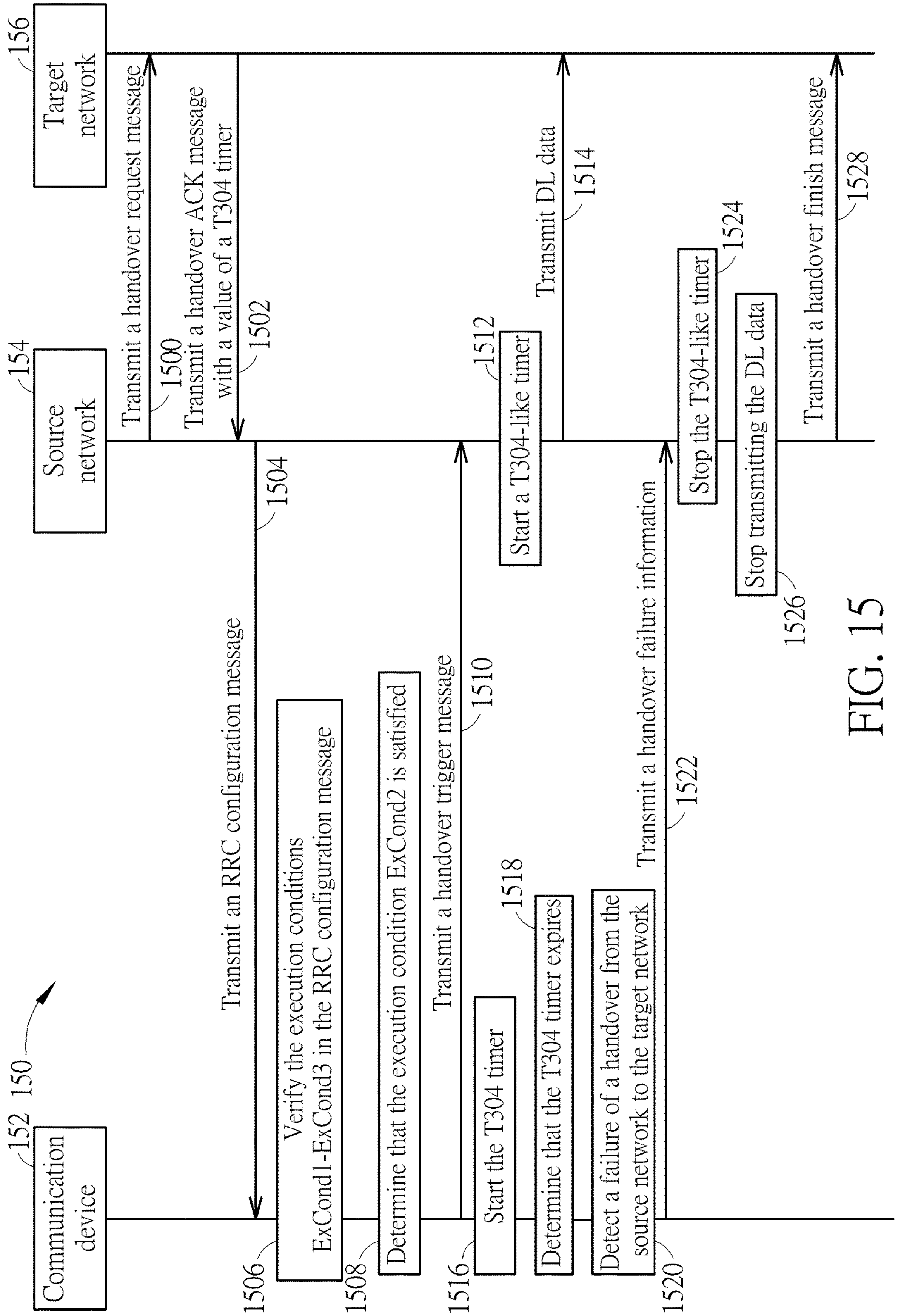
FIG. 15 is a sequence diagram of a process according to an example of the present invention.

FIG. 15 is a sequence diagram of a process 150 according to an example of the present invention. The process 150 is performed by a communication device 152 (e.g., the communication device 20 in FIG. 2), a source network 154 and a target network 156 (e.g., the target network TN2 in FIG. 4). First, the source network 154 transmits a handover request message to the target network 156 (Step 1500), and the target network 156 transmits a handover ACK message with a value of a T304 timer to the source network 154 in response to the handover request message (Step 1502). The source network 154 transmits an RRC configuration message (e.g., the RRC configuration message 40 in FIG. 4) to the communication device 152 in response to the handover ACK message (Step 1504). Taking the RRC configuration message 40 as an example, the communication device 152 verifies the execution conditions ExCond1-ExCond3 in the RRC configuration message 40 after receiving the RRC configuration message 40 (Step 1506), and determines that the execution condition ExCond2 is satisfied (Step 1508). The execution condition ExCond2 is corresponding to the target network 156. The communication device 152 transmits a handover trigger message to the source network 154, when the execution condition ExCond2 is satisfied (Step 1510).

Then, the source network 154 starts a T304-like timer and transmits DL data to the target network 156, in response to the handover trigger message (Steps 1512 and 1514). The communication device 152 starts the T304 timer, after transmitting the handover trigger message to the source network 154 (Step 1516). The communication device 152 determines that the T304 timer expires (Step 1518). The communication device 152 detects a failure of a handover from the source network 154 to the target network 156, when the T304 timer expires (Step 1520). The communication device 152 transmits a handover failure information to the source network 154, when the T304 timer expires and the communication device 152 does not declare the RLF between the communication device 152 and the source network 154 (Step 1522). Finally, the source network 154 stops the T304-like timer, stops transmitting the DL data to the target network 156 and transmits a handover finish message to the source network 154, in response to the handover failure message (Steps 1524, 1526 and 1528).

The processes 90, 120 and 140 are the cases that the failure of the handover and the RLF occur, while the processes 100, 130 and 150 are the cases that the failure of the handover occurs but the RLF does not occur. In the processes 90-150, the communication device 92/102/112/122/132/142/152 determines whether the failure of the handover occurs according to the T304 timer. In the processes 90-110, the target network 96/106/116 determines whether the failure of the handover occurs according to the T-HF timer. In the processes 120-150, the source network 124/134/144/154 determines whether the failure of the handover occurs according to the T304-like timer.

In the processes 120-130, the communication device 122/132 informs the source network 124/134 of the value of the T304 timer via the handover trigger message. In the processes 140-150, the target network 146/156 informs the source network 144/154 of the value of the T304 timer via the handover ACK message. In the processes 140-150, the source network 144/154 transmits the handover request message to all target networks (e.g., the target networks TN1-TN3 in FIG. 4), and each of the target networks transmits one handover ACK message to the source network 144/154 in response to the handover request message (not shown).

Figure 16:
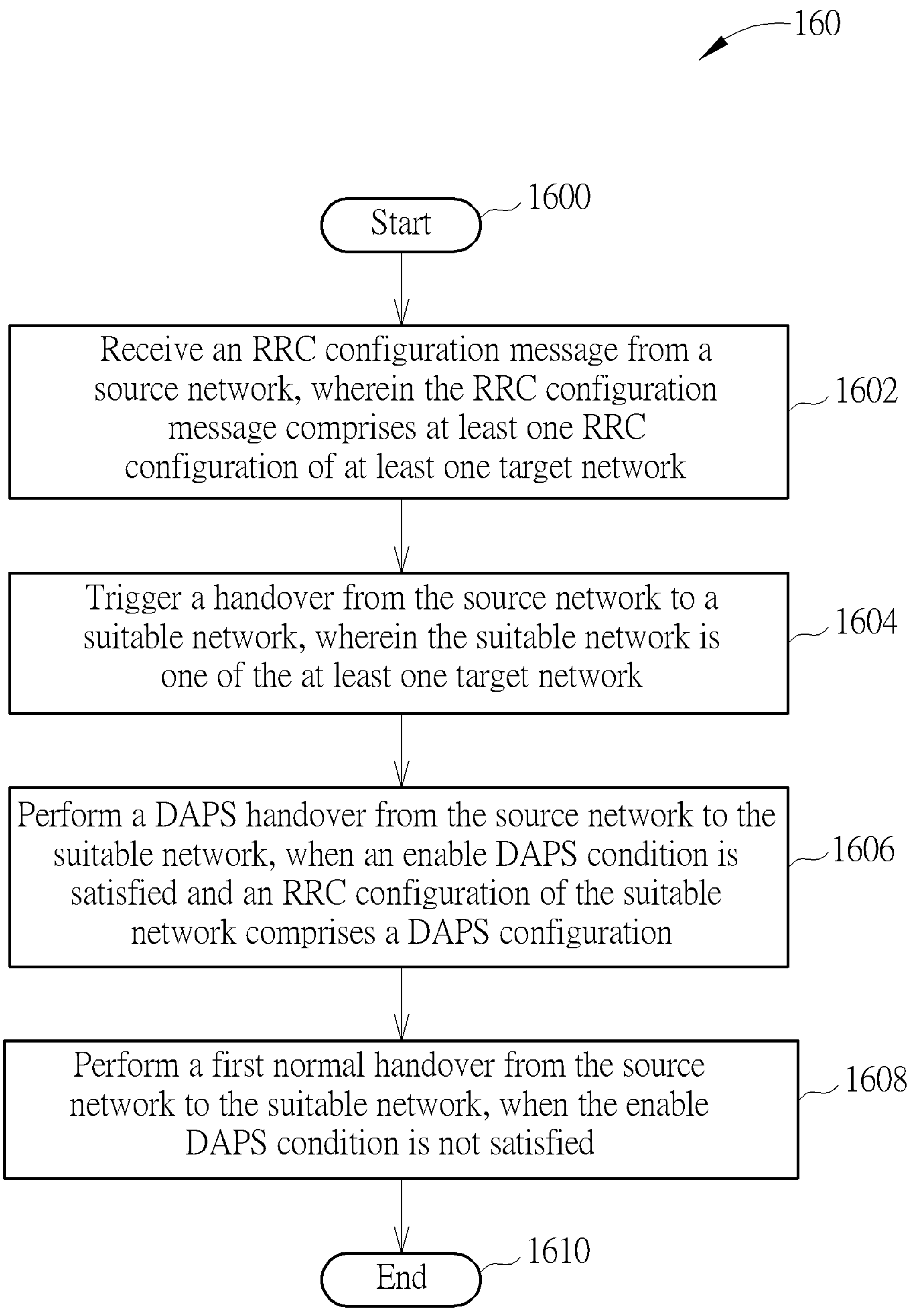
FIG. 16 is a flowchart of a process according to an example of the present invention.

FIG. 16 is a flowchart of a process 160 according to an example of the present invention. The process 160 may be utilized in a communication device (e.g., the communication device 20 in FIG. 2), to handle a handover. The process 160 may be compiled into the program codes 214 and includes the following steps:

Step 1600: Start.

Step 1602: Receive an RRC configuration message from a source network, wherein the RRC configuration message comprises at least one RRC configuration of at least one target network.

Step 1604: Trigger a handover from the source network to a suitable network, wherein the suitable network is one of the at least one target network.

Step 1606: Perform a DAPS handover from the source network to the suitable network, when an enable DAPS condition is satisfied and an RRC configuration of the suitable network comprises a DAPS configuration.

Step 1608: Perform a first normal handover from the source network to the suitable network, when the enable DAPS condition is not satisfied.

Step 1610: End.

According to the process 160, the communication device 20 receives an RRC configuration message from a source network. The RRC configuration message comprises at least one RRC configuration of at least one target network. The at least one RRC configuration is corresponding to the at least one target network, respectively. Then, the communication device 20 triggers a handover from the source network to a suitable network. The suitable network is one of the at least one target network. The communication device 20 performs a DAPS handover from the source network to the suitable network, when an enable DAPS condition is satisfied and an RRC configuration of the suitable network comprises a DAPS configuration. The RRC configuration of the suitable network is one of the at least one RRC configuration. The communication device 20 performs a first normal handover from the source network to the suitable network, when the enable DAPS condition is not satisfied. That is, the handover may be the DAPS handover, when the enable DAPS condition is satisfied and the RRC configuration of the suitable network comprises the DAPS configuration. The handover may be the first normal handover, when the enable DAPS condition is not satisfied. Thus, the handover is performed flexibly according to the enable DAPS condition.

Realization of the process 160 is not limited to the above description. The following examples may be applied to realize the process 160.

In one example, the communication device 20 detects (or declares) a communication failure between the communication device 20 and the source network, and triggers a reestablishment procedure according to the communication failure. Then, the communication device 20 selects the suitable network (e.g., during the reestablishment procedure), after triggering the reestablishment procedure. The communication device 20 sets a flag according to the communication failure. In one example, the flag indicates that the DAPS handover is disabled. In one example, the communication failure comprises at least one of a failure of a second normal handover, a failure of a conditional handover or an RLF.

In one example, the RRC configuration message comprises at least one execution condition of the at least one target network. In one example, the at least one execution condition is corresponding to the at least one RRC configuration, respectively.

In one example, the communication device 20 determines whether the enable DAPS condition is satisfied, after triggering the DAPS handover. There are various ways to determine whether the enable DAPS condition is satisfied. In one example, the communication device 20 determines that the enable DAPS condition is satisfied, when the handover is triggered by a satisfied execution condition of the at least one execution condition (i.e., one of the at least one execution condition is satisfied). In one example, the communication device 20 determines that the enable DAPS condition is not satisfied, when the handover is not triggered by the at least one execution condition (i.e., all of the at least one execution condition is not satisfied). In one example, the communication device 20 determines that the enable DAPS condition is satisfied, when the flag is not set. In one example, the communication device 20 determines that the enable DAPS condition is not satisfied, when the flag is set.

In one example, the communication device 20 detaches from the source network, when performing the first normal handover. In one example, the communication device 20 keeps connecting to the source network, when performing the DAPS handover. In one example, the communication device 20 releases the flag, if the suitable network is not the one of the at least one target network. In one example, the communication device 20 performs the reestablishment procedure with the suitable network, if the suitable network is not the one of the at least one target network.

The examples of the processes 30 and 80 may be applied to the process 160, and are not narrated herein for brevity.

Figure 17:
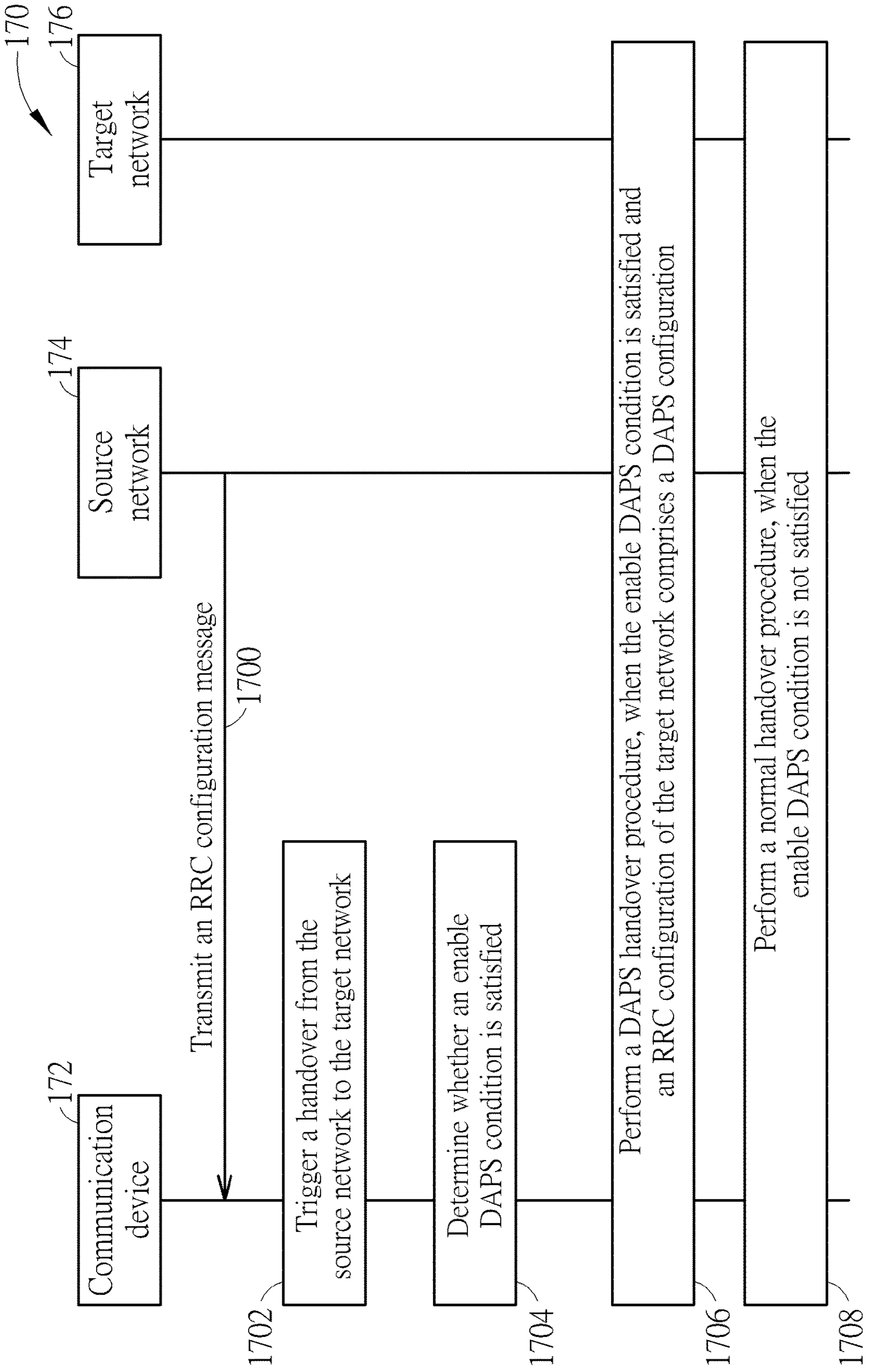
FIG. 17 is a sequence diagram of a process according to an example of the present invention.

FIG. 17 is a sequence diagram of a process 170 according to an example of the present invention. The process 170 is performed by a communication device 172 (e.g., the communication device 20 in FIG. 2), a source network 172 and a target network 176 (e.g., the target network TN1 or the target network TN2 in FIG. 4). First, the source network 174 transmits an RRC configuration message (e.g., the RRC configuration message 40 in FIG. 4) to the communication device 172 (Step 1700). The communication device 172 triggers a handover from the source network 174 to the target network 176 (Step 1702), and determines whether an enable DAPS condition is satisfied (Step 1704). The communication device 172, the source network 174 and the target network 176 perform a DAPS handover procedure (e.g., the communication device 172 performs a DAPS handover from the source network 174 to the target network 176), when the enable DAPS condition is satisfied and an RRC configuration of the target network comprises a DAPS configuration (Step 1706). The RRC configuration of the target network 176 is comprised in the RRC configuration message. The communication device 172, the source network 174 and the target network 176 perform a normal handover procedure (e.g., the communication device 172 performs a normal handover from the source network 174 to the target network 176), when the enable DAPS condition is not satisfied (Step 1708).

Figure 18:
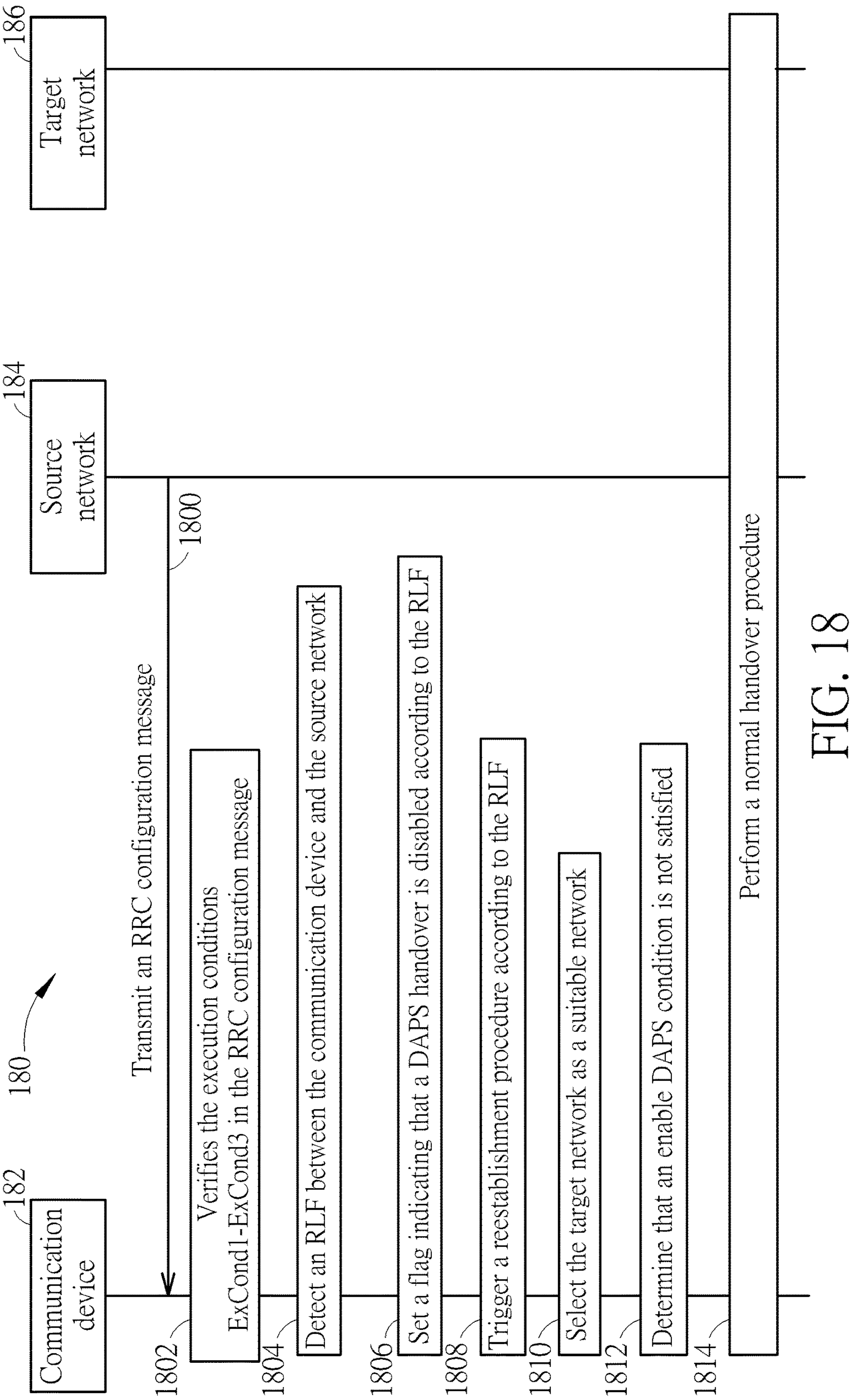
FIG. 18 is a sequence diagram of a process according to an example of the present invention.

FIG. 18 is a sequence diagram of a process 180 according to an example of the present invention. The process 180 is performed by a communication device 182 (e.g., the communication device 20 in FIG. 2), a source network 184 and a target network 186 (e.g., the target network TN2 in FIG. 4). First, the source network 184 transmits an RRC configuration message (e.g., the RRC configuration message 40 in FIG. 4) to the communication device 182 (Step 1800). Taking the RRC configuration message 40 as an example, the communication device 182 verifies the execution conditions ExCond1-ExCond3 in the RRC configuration message 40, after receiving the RRC configuration message 40 (Step 1802). Then, the communication device 182 detects an RLF between the communication device 182 and the source network 184 (Step 1804). The communication device 182 sets a flag indicating that a DAPS handover is disabled and triggers a reestablishment procedure, according to the RLF (Steps 1806 and 1808). The communication device 182 selects the target network 186 as a suitable network (Step 1810). The target network 186 may be one of the target networks TN1-TN3 in FIG. 4. For example, the target networks TN2 may be selected as the suitable network. The communication device 182 determines that an enable DAPS condition is not satisfied (Step 1812), because the flag is set. Thus, the communication device 182, the source network 184 and the target network 186 perform a normal handover procedure (Step 1814).

Figure 19:
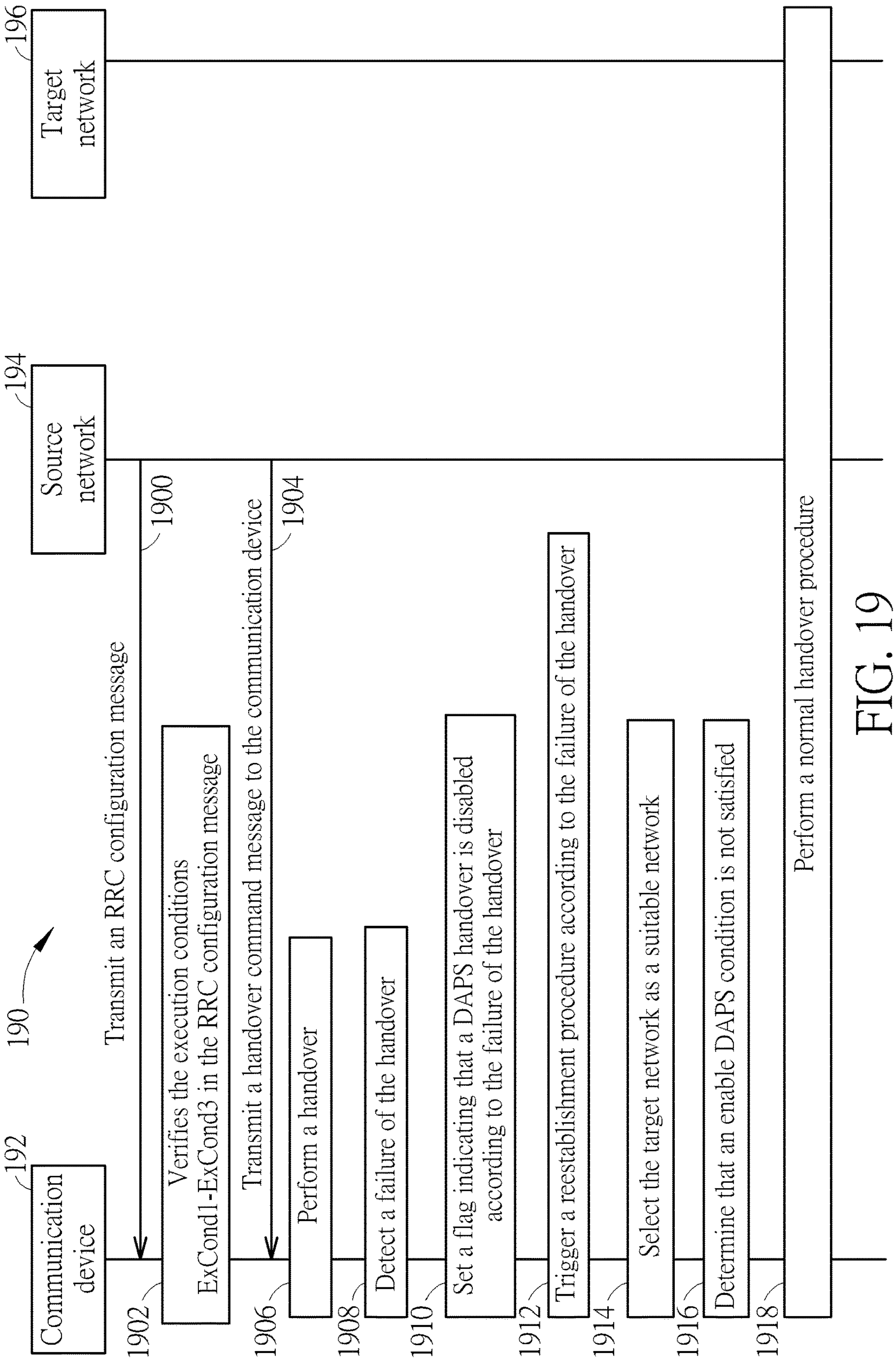
FIG. 19 is a sequence diagram of a process according to an example of the present invention.

FIG. 19 is a flowchart of a process 190 according to an example of the present invention. The process 190 is performed by a communication device 192 (e.g., the communication device 20 in FIG. 2), a source network 194 and a target network 196 (e.g., the target network TN2 in FIG. 4). First, the source network 194 transmits an RRC configuration message (e.g., the RRC configuration message 40 in FIG. 4) to the communication device 192 (Step 1900). Taking the RRC configuration message 40 as an example, the communication device 192 verifies the execution conditions ExCond1-ExCond3 in the RRC configuration message 40, after receiving the RRC configuration message 40 (Step 1902). The source network 194 transmits a handover command message to the communication device 192 (Step 1904). The communication device 192 performs a handover in response to the handover command message (Step 1906), and detects a failure of the handover (Step 1908). The communication device 192 sets a flag indicating that a DAPS handover is disabled and triggers a reestablishment procedure, according to the failure of the handover (Steps 1910 and 1912). The communication device 192 selects the target network 196 as a suitable network (Step 1914). The target network 196 may be one of the target networks TN1-TN3 in FIG. 4. For example, the target networks TN2 may be selected as the suitable network. The communication device 192 determines that an enable DAPS condition is not satisfied (Step 1916), because the flag is set. Thus, the communication device 192, the source network 194 and the target network 196 perform a normal handover procedure (Step 1918).

Figure 20:
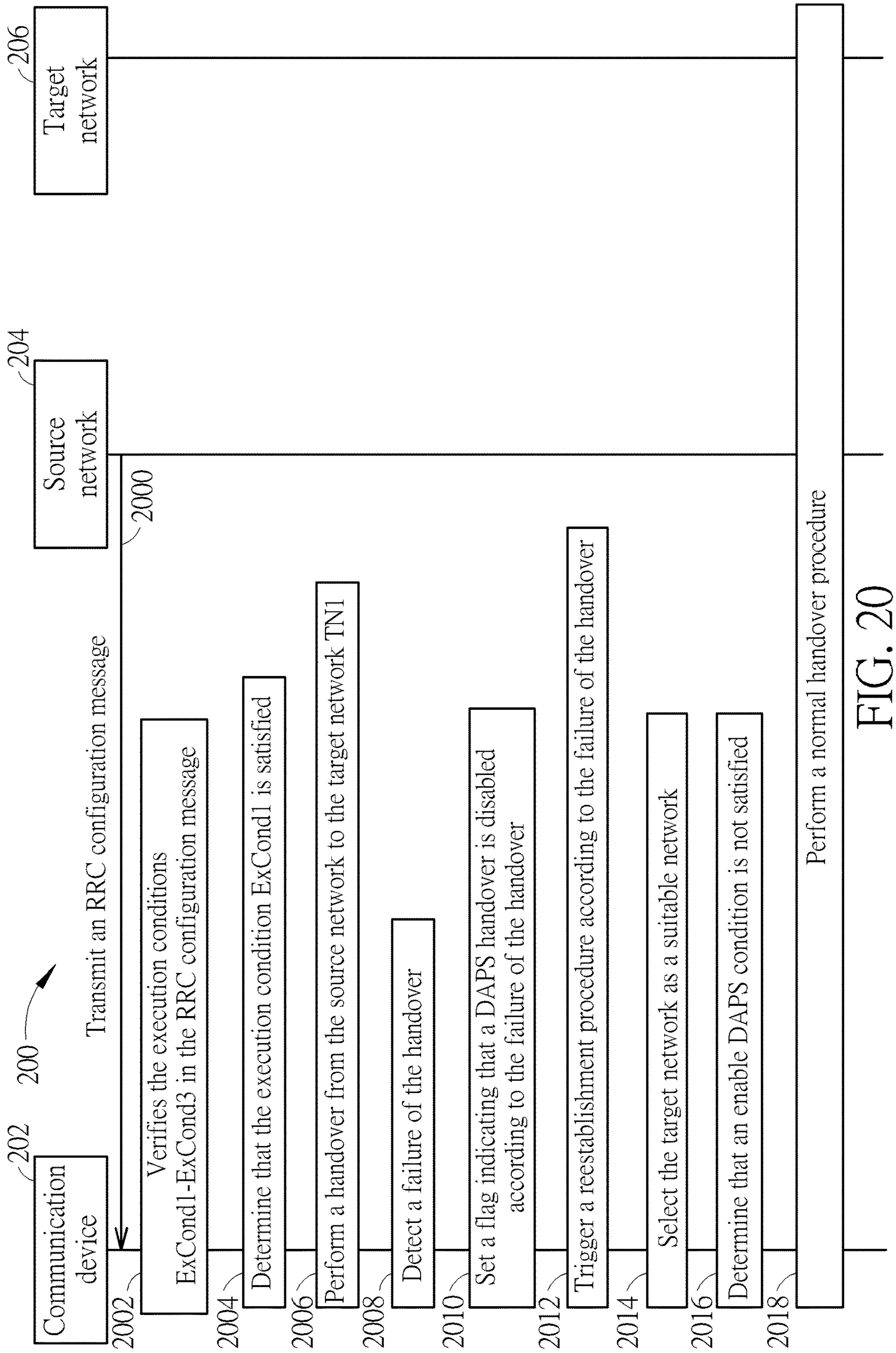
FIG. 20 is a sequence diagram of a process according to an example of the present invention.

FIG. 20 is a sequence diagram of a process 200 according to an example of the present invention. The process 200 is performed by a communication device 202 (e.g., the communication device 20 in FIG. 2), a source network 204 and a target network 206 (e.g., the target network TN2 in FIG. 4). First, the source network 204 transmits an RRC configuration message (e.g., the RRC configuration message 40 in FIG. 4) to the communication device 202 (Step 2000). Taking the RRC configuration message 40 as an example, the communication device 202 verifies the execution conditions ExCond1-ExCond3 in the RRC configuration message 40 after receiving the RRC configuration message 40 (Step 2002), and determines that the execution condition ExCond1 is satisfied (Step 2004). Then, the communication device 202 performs a handover from the source network 204 to the target network TN1 in FIG. 4 (Step 2006), and detects a failure of the handover (Step 2008). The communication device 202 sets a flag indicating that a DAPS handover is disabled and triggers a reestablishment procedure, according to the failure of the handover (Steps 2010 and 2012). The communication device 202 selects the target network 206 as a suitable network (Step 2014). The target network may be one of the target networks TN2-TN3 in FIG. 4. For example, the target networks TN2 may be selected as the suitable network. The communication device 202 determines that an enable DAPS condition is not satisfied (Step 2016), because the flag is set. Thus, the communication device 202, the source network 204 and the target network 206 perform a normal handover procedure (Step 2018).

Figure 21:
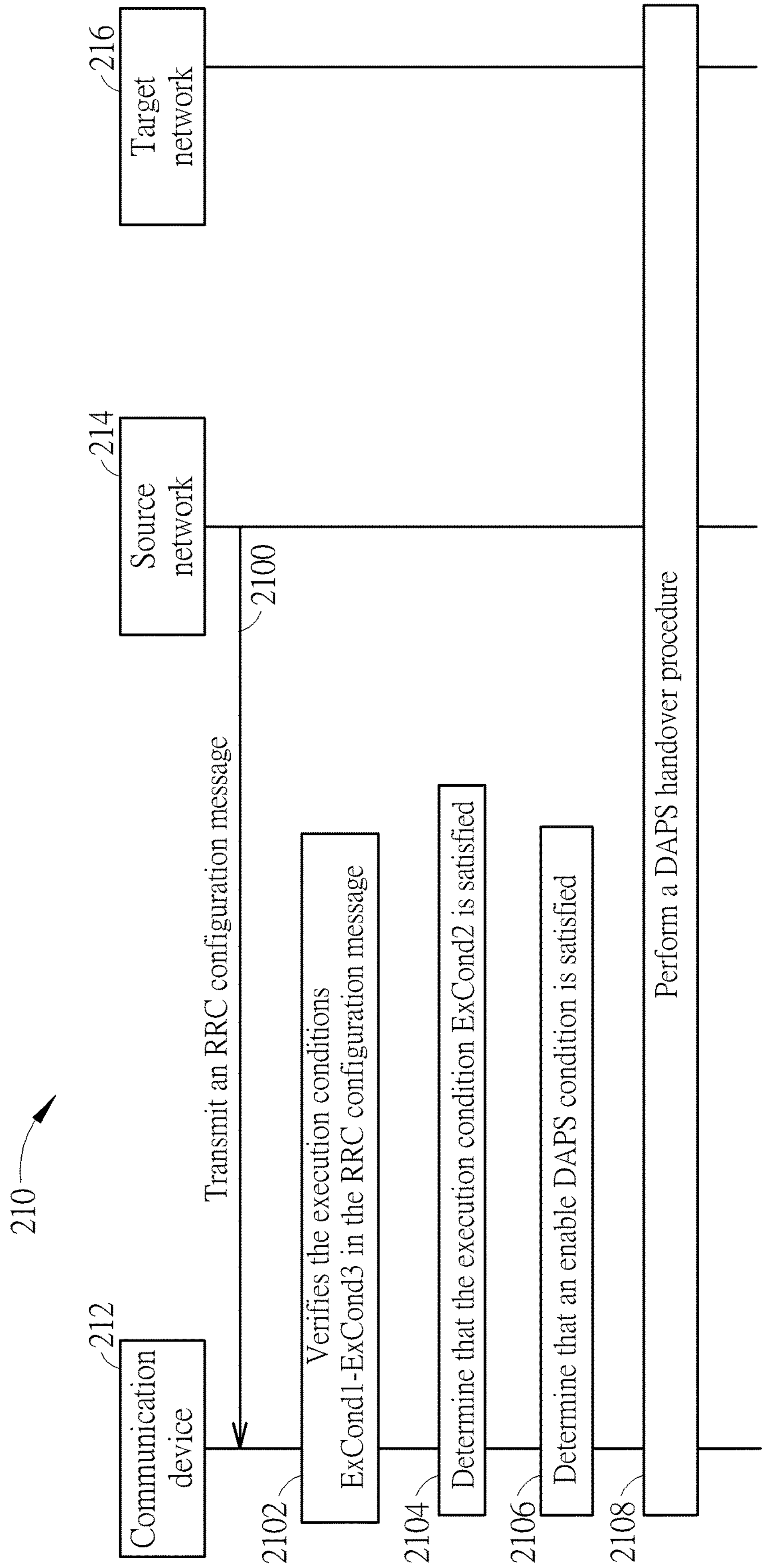
FIG. 21 is a sequence diagram of a process according to an example of the present invention.

FIG. 21 is a sequence diagram of a process 210 according to an example of the present invention. The process 210 is performed by a communication device 212 (e.g., the communication device 20 in FIG. 2), a source network 214 and a target network 216 (e.g., the target network TN2 in FIG. 4). First, the source network 214 transmits an RRC configuration message (e.g., the RRC configuration message 40 in FIG. 4) to the communication device 212 (Step 2100). Taking the RRC configuration message 40 as an example, the communication device 212 verifies the execution conditions ExCond1-ExCond3 in the RRC configuration message 40 after receiving the RRC configuration message 40 (Step 2102), and determines that the execution condition ExCond2 is satisfied (Step 2104). The communication device 212 determines that an enable DAPS condition is satisfied (Step 2106), because a flag indicating that a DAPS handover is disabled is not set. Thus, the communication device 212, the source network 214 and the target network 216 perform a DAPS handover procedure (Step 2108), because the enable DAPS condition is satisfied and an RRC configuration of the target network 216 (e.g., the RRC configuration RRCReconfig2 in FIG. 4) comprises a DAPS configuration.

Figure 22:
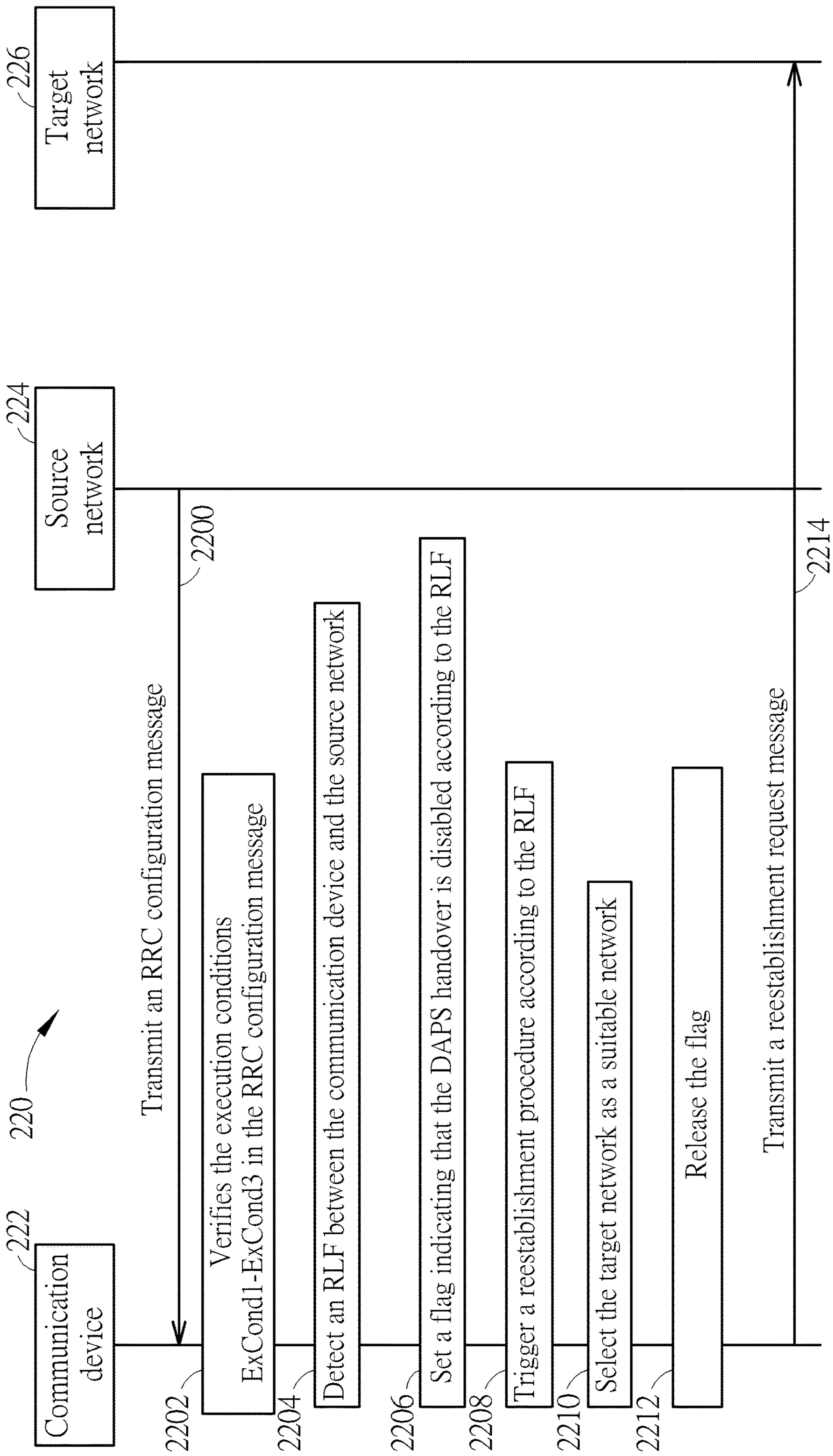
FIG. 22 is a sequence diagram of a process according to an example of the present invention.

FIG. 22 is a sequence diagram of a process 220 according to an example of the present invention. The process 220 is performed by a communication device 222 (e.g., the communication device 20 in FIG. 2), a source network 224 and a target network 226. First, the source network 224 transmits an RRC configuration message (e.g., the RRC configuration message 40 in FIG. 4) to the communication device 222 (Step 2200). Taking the RRC configuration message 40 as an example, the communication device 222 verifies the execution conditions ExCond1-ExCond3 in the RRC configuration message 40, after receiving the RRC configuration message 40 (Step 2202). Then, the communication device 222 detects an RLF between the communication device 222 and the source network 224 (Step 2204). The communication device 222 sets a flag indicating that the DAPS handover is disabled and triggers a reestablishment procedure, according to the RLF (Steps 2206 and 2208). The communication device 222 selects the target network 226 as a suitable network (Step 2210). The target network 226 is not one of the target networks TN1-TN3 in FIG. 4. That is, information of the target network 226 is not comprised in the RRC configuration message. Thus, the communication device 222 releases the flag (Step 2212), and transmits a reestablishment request message to the target network 226 (e.g., performs the reestablishment procedure with the target network 226) (Step 2214).

The detail of the DAPS handover procedure can be referred to the processes 30 and 80, and not narrated herein for brevity.

The operation of "determine" described above may be replaced by the operation of "compute", "calculate", "obtain", "generate", "output, "use", "choose/select", "decide" or "is configured to". The operation of "detect" described above may be replaced by the operation of "monitor", "receive", "sense" or "obtain". The phrase of "according to" described above may be replaced by "in response to". The phrase of "corresponding to" described above may be replaced by "of" or "associated with". The term of "via" described above may be replaced by "on", "in" or "at". The term of "when" described above may be replaced by "in response to".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, embodiments of the present invention provide a communication device and method for handling a handover. The handover is performed robustly with the execution condition(s), and/or is performed flexibly according to the enable DAPS condition. Thus, the communication device can handle a robust handover with the low interruption time in the high frequency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a handover of a communication device, comprising:

receiving a radio resource control (RRC) configuration message from a source network, wherein the RRC configuration message comprises at least one execution condition of at least one target network;

transmitting a handover trigger message to the source network, when an execution condition of the at least one execution condition is satisfied;

determining a target network from the at least one target network according to the RRC configuration message in response to the execution condition being satisfied, wherein the target network is corresponding to the execution condition;

performing the handover from the source network to the target network of the at least one target network in response to transmitting the handover trigger message to the source network;

keeping connecting to the source network; and transmitting a handover complete message to the target network, after performing the handover;

wherein the handover trigger message comprises an identity (ID) information of the target network.

2. The method of claim 1, further comprising:

transmitting a measurement report as the handover trigger message to the source network, when the execution condition is satisfied.

3. The method of claim 1, further comprising:

starting a timer, after transmitting the handover trigger message to the source network; and stopping the timer, after transmitting the handover complete message to the target network.

4. The method of claim 3, wherein the handover trigger message comprises a value of the timer.

5. The method of claim 1, wherein the RRC configuration message comprises an RRC configuration of the target network, and the RRC configuration comprises a dual active protocol stack (DAPS) configuration.

6. The method of claim 1, wherein the RRC configuration message comprises at least one RRC configuration of the at least one target network, and the at least one RRC configuration is corresponding to the at least one execution condition, respectively.

7. A method for handling a handover of a communication device, comprising:

receiving a radio resource control (RRC) configuration message from a source network, wherein the RRC configuration message comprises at least one execution condition of at least one target network;

transmitting a handover trigger message to the source network, when an execution condition of the at least one execution condition is satisfied;

keeping connecting to the source network;

starting a timer, after transmitting the handover trigger message to the source network;

determining a failure of the handover from the source network to a target network of the at least one target network, when the timer expires, wherein the target network is corresponding to the execution condition; and triggering a handover failure procedure according to the failure of the handover;

wherein the handover trigger message comprises an identity (ID) information of the target network.

8. The method of claim 7, further comprising:

transmitting a measurement report as the handover trigger message to the source network, when the execution condition is satisfied.

9. The method of claim 7, wherein the step of triggering the handover failure procedure comprises:

declaring a radio link failure (RLF) between the communication device and the source network, after starting the timer; and triggering a reestablishment procedure, after declaring the RLF.

10. The method of claim 7, wherein the step of triggering the handover failure procedure comprises:

transmitting a handover failure information indicating the failure of the handover to the source network, when the timer expires and the communication device does not detect a RLF between the communication device and the source network.

11. The method of claim 7, wherein the handover trigger message comprises a value of the timer.

12. The method of claim 7, wherein the RRC configuration message comprises an RRC configuration of the target network, and the RRC configuration comprises a dual active protocol stack (DAPS) configuration.

13. The method of claim 7, wherein the RRC configuration message comprises at least one RRC configuration of the at least one target network, and the at least one RRC configuration is corresponding to the at least one execution condition, respectively.

14. A method for handling a handover of a communication device, comprising:

receiving a radio resource control (RRC) configuration message from a source network, wherein the RRC configuration message comprises at least one RRC configuration of at least one target network;

triggering a handover from the source network to a suitable network, wherein the suitable network is one of the at least one target network, an RRC configuration of the suitable network comprises a dual active protocol stack (DAPS) configuration, and the RRC configuration of the suitable network is one of the at least one RRC configuration;

performing a DAPS handover from the source network to the suitable network, when an enable DAPS condition is satisfied; and performing a first normal handover from the source network to the suitable network, when the enable DAPS condition is not satisfied;

wherein the RRC configuration message comprises at least one execution condition of the at least one target network, and the at least one execution condition is respectively corresponding to the at least one RRC configuration;

wherein the method further comprises determining that the enable DAPS condition is satisfied, when the handover is triggered by a satisfied execution condition of the at least one execution condition.

15. The method of claim 14, further comprising:

detecting a communication failure;

triggering a reestablishment procedure according to the communication failure;

selecting the suitable network, after triggering the reestablishment procedure; and setting a flag according to the communication failure;

wherein the flag indicates that the DAPS handover is disabled.

16. The method of claim 15, wherein the communication failure comprises at least one of a failure of a second normal handover, a failure of a conditional handover or a radio link failure (RLF).

17. The method of claim 14, further comprising: determining that the enable DAPS condition is not satisfied, when the handover is not triggered by the at least one execution condition.

18. The method of claim 14, further comprising: determining that the enable DAPS condition is satisfied, when a flag is not set; and determining that the enable DAPS condition is not satisfied, when the flag is set;

wherein the flag indicates that the DAPS handover is disabled.

19. The method of claim 14, wherein further comprising: detaching from the source network, when performing the first normal handover.

20. The method of claim 14, further comprising: keeping connecting to the source network, when performing the DAPS handover.

* * * * *